US006415046B1

(12) United States Patent
Kerut, Sr.

(10) Patent No.: US 6,415,046 B1
(45) Date of Patent: Jul. 2, 2002

(54) METHOD AND APPARATUS FOR THE EARLY DETECTION OF TISSUE PATHOLOGY USING WAVELET TRANSFORMATION

(76) Inventor: Edmund Kenneth Kerut, Sr., 8113 Ferrara Dr., Harahan, LA (US) 70123

( * ) Notice: Subject to any disclaimer, the term of this patent is extended or adjusted under 35 U.S.C. 154(b) by 0 days.

(21) Appl. No.: 09/414,123

(22) Filed: Oct. 7, 1999

(51) Int. Cl.$^7$ .................................................. G06K 9/00
(52) U.S. Cl. ....................................... 382/128; 382/130
(58) Field of Search ................................. 382/128, 130, 382/131, 132, 133, 240, 248, 276

(56) References Cited

U.S. PATENT DOCUMENTS

| | | |
|---|---|---|
| 4,664,123 A | 5/1987 | Iinuma ........................ 600/443 |
| 4,817,015 A | 3/1989 | Insana et al. ................ 600/437 |
| 5,097,836 A | 3/1992 | Yamada et al. .............. 600/443 |
| 5,253,530 A | 10/1993 | Letcher, III ................... 73/602 |
| 5,313,946 A | 5/1994 | Melton, Jr. .................. 600/437 |
| 5,474,070 A | 12/1995 | Ophir et al. ................. 600/437 |
| 5,602,760 A | 2/1997 | Chacon et al. .............. 382/103 |
| 5,619,998 A | 4/1997 | Abdel-Malek et al. ...... 600/437 |
| 5,638,820 A | 6/1997 | Chen et al. .................. 600/437 |
| 5,800,356 A | 9/1998 | Criton et al. ................ 600/441 |
| 5,802,369 A | 9/1998 | Ganesh et al. .............. 704/247 |

OTHER PUBLICATIONS

Mojsilovic, A, Characterization of Visually Similiar Diffuse Diseases from B–Scan Liver Images Using Nonseparable Wavelet Transform, IEEE, vol. 17. No. 4, Aug. 1998, p. 545, col. 1, lines 15–65.

Mojsilovic, A., Analysis and Characterization of Myocardial Tissue with the Wavelet Image Extension, IEEE, 1995, p. 505, col. 1, lines 40–65.

Wild, J. J., et al., "Visualization of the Excised Human Heart by Means of Reflected Ultrasound or Echography", Am. Heart J., Dec. 1957; 54:903–906.

Miller J. G., et al., "Ultrasonic Characterization of Myocardium", Progress in Cardiovascular Diseases, Sep./Oct. 1985; XXVIII(2):85–110.

Masuyama, T., et al., "Serial Measurements of Integrated Ultrasonic Backscatter in Human Cardiac Allografts for the Recognition of Acute Rejection", Circulation, Mar. 1990; 81(3):829–839.

Wickline, S. A., et.,"Sensitive Detection of the Effects of Reperfusion on Myocardium by Ultrasonic Tissue Characterization with Integrated Backscatter", Circulation, 1986; 74:389–400.

(List continued on next page.)

*Primary Examiner*—Andrew W. Johns
*Assistant Examiner*—Shervin K Nakhjavan
(74) *Attorney, Agent, or Firm*—Raymond G. Areanx; Lisa Velez

(57) ABSTRACT

A method and apparatus for the early detection of tissue pathology using wavelet decomposition, such as Cardiomyopathy, for the early detection and diagnosis of disease using multi-dimensional non-invasive imaging techniques. The apparatus for early detection of tissue pathology includes a tissue texture quantifier apparatus having a wavelet decomposer for decomposing a region-of-interest (ROI) of a digitized image of anatomical tissue into vertical, horizontal and diagonal detail coefficients and a tissue pathology evaluator having a standard reference model. The tissue texture quantifier further includes a wavelet calculator to calculate the energy content for each of the vertical detail coefficient, the horizontal detail coefficient and the diagonal detail coefficient. Moreover, the tissue texture quantifier includes a summer for summing the energy content of the vertical detail coefficient, the horizontal detail coefficient and the diagonal detail coefficient and a normalizer for normalizing all energy content and the summed energy content.

145 Claims, 2 Drawing Sheets

OTHER PUBLICATIONS

Sagar, K. B., et al., "Intramyocardial Variability in Integrated Backscatter: Effects of Coronary Occlusion and Reperfusion", Circulation, 1987; 75(2):436–442.

Sagar, K. B., et al., "Role of Ultrasonic Tissue Characterization to Distinguish Reversible from Irreversible Myocardial Injury", JASE, Nov./Dec. 1990; 3(6):471–477.

IEEE Standard Glossary of Image Processing and Pattern Recognition Terminology, IEEE Press, Mar. 26, 1990; 7–14.

Smith, S. W., et al., "Ultrasound Speckle Size and Lesion Signal to Noise Ratio: Verification of Theory", Ultras. Imag., 1984; 6:174.

Wagner, R. F., et al.,"Statistics of Speckle of Ultrascan B–Scans", IEEE Trans. Sonics Ultras., May 1983; 30(3):156–163.

Skorton, D. J., et al., "Quantitative Texture Analysis in Two–Dimensional Echocardiography: Application to the Diagnosis of Experimental Myocardial Contusion", Circulation, Jul. 1983; 68(1):217–223.

Chandrasekaran, K., et al., "Feasibility of Identifying Amyloid and Hypertrophic Cardiomyopathy with the Use of Computerized Quantitative Texture Analysis of Clinical Echocardiographic Data", JACC, Mar. 15, 1989; 13(4):832–840.

Pinamonti, B., et al., "Quantitative Texture Analysis in Two–Dimensional Echocardiography: Application to the Diagnosis of Myocardial Amyloidosis", JACC, Sep. 1989; 14(3):666–671.

Picano, E., et al., "Increased Echodensity of Transiently Asynergic Myocardium in Humans: a Novel Echocardiographic Sign of Myocardial Ischemia", JACC, Jan. 1993; 21(1):199–207.

Marini, C., et al., "Cyclic Variation in Myocardial Gray Level as a Marker of Viability in Man: A Videodensitometric Study", Eur. Heart J., Mar. 1996; 17:472–479.

Stempfle, H., et al., "Serial Changes During Acute Cardiac Allograft Rejection: Quantitative Ultrasound Tissue Analysis Versus Myocardial Histologic Findings", JACC, Jul. 1993; 22(1):310–317.

Ferdeghini, E. M., et al., "Quantitative Texture Analysis in Echocardiography: Application to the Diagnosis of Myocarditis", J. Clin. Ultrasound, Jun. 1991; 19(5):263–270.

Bertrand, O., et al., "Time–Frequency Digital Filtering Based on an Invertible Wavelet Transform: An Application of Evoked Potentials", IEEE Trans. on Biomedical Engineering, Jan. 1994; 41(1):77–88.

Gamero, L. G., et al., "Heart Rate Variability Analysis Using Wavelet Transform", IEEE Computers in Cardiology, 1996; 177–180.

Batista, A., "A Multiresolution Wavelet Method for Characterization of Ventricular Late Potentials", IEEE Computers in Cardiology, 1996; 625–628.

Meste, O., et al., "Ventricular Late Potentials Characterization in Time–frequency Domain by Means of a Wavelet Transform", IEEE Transactions on Biomedical Engineering, Jul. 1994; 41(7):625–634.

Press, W. H., et al., Numerical Recipes in FORTRAN: The Art of Scientific Computing, $2^{nd}$ Ed., New York: Cambridge University Press, 1992; 596–597.

Mecocci, A., "Texture Segmentation in Remote Sensing Images by Means of Packet Wavelets and Fuzzy Clustering, International Society of Optical Engineering", Synthetic Aperture Radar and Passive Microwave Sensing, 1995; 2584:142–151.

Wickerhauser, M. V., Adapted Wavelet Analysis from Theory to Software, Wellesley, Massachusetts: AK Peters, LTD, 1994; 361–377.

Prasad, L., et al., Wavelet Analysis with Applications to Image Processing, Boca Raton, Florida: CRC Press, LLC, 1997; 235–239, 258–262.

Chui, C. K., Wavelets: A Mathematical Tool for Signal Analysis, Philadelphia: Society for Industrial and Applied Mathematics, 1997; 178–180.

Carter, P. H., "Texture Discrimination Using Wavelets", Applications of Digital Image Processing XIV; 1991; SPIE 1567.

Mojsilovic, A., et al., "Wavelet Image Extension for Analysis and Classification of Infarcted Myocardial Tissue", IEEE Transactions on Biomedical Engineering, 1997; 44(9):856–866.

Coifman, R. R.,et al., "Entropy–Based Algorithms for Best Basis Selection", IEEE Transaction on Inf. Theory, Mar. 1992;38(2):713–718.

Otto, C. M., The Practice of Clinical Echocardiography, Pennsylvania: W. B. Saunders Company, 1997: 75–93.

Sahn, D. J., et al., "Recommendations Regarding Quantitation in M–mode Echocardiography: Results of a Survey of Echocardiographic Measurements", Circulation, Dec. 1978; 58(6):1072–1083.

Gonzales, R. C., et al., Digital Image Processing, Reading, Massachusetts: Addison–Wesley Publishing Company, 1992:508.

Mojsilovic, A., et al., "Automatic Segmentation of Intravascular Ultrasound Images: A Texture–Based Approach", Annals of Biomedical Engineering; 1997; 25:1059–1071.

Neskovic, A.N., et al., "Myocardial Tissue Characterization after Acute Myocardial Infarction with Wavelet Image Decomposition: A Novel Approach for the Detection of Myocardial Viability in the Early Post Infarction Period", Circulation; Aug. 18, 1998; 98:634–641.

Giles, T. D., et al., "Changes in Protein Kinase C in Early Cardiomyopathy and in Gracilis Muscle in the BB/Wor Diabetic Rat", Am. J. Physiol., 1998; 274:H295–H307.

Misiti, M., et al., Wavelet Toolbox, Math Works, Inc.: Natick, Massachusetts, 1997: 1–1–2–71.

Haralick, R. M., "Statistical and Structural Approaches to Texture", Proceedings of the IEEE; May 1979; 67(5):786–804.

Schecter, S.O., et al., "Ultrasonic Tissue Characterization: Review of a Noninvasive Technique for Assessing Myocardial Viability", Echocardiography: A Jrnl. of CV Ultrasound & Allied Tech.; Jul. 1996; 13(4):415–430.

Thomas, J., "Digital Imaging Processing", Principles and Practice of Echocardiography, $2^{nd}$ Edition, Lea and Febiger, International Copyright Union, USA, 56–66.

METHOD AND APPARATUS FOR THE EARLY DETECTION OF TISSUE PATHOLOGY USING WAVELET TRANSFORMATION

TECHNICAL FIELD

The present invention relates to methodologies for detecting tissue pathology, more particularly, to a method and apparatus for the early detection of tissue pathology using a wavelet decomposition method on tissue data obtained by using a multi-dimensional non-invasive imaging technique. Such method and apparatus provides a tool for physicians and researchers to diagnose and thus treat early stages of diseases or other disorders affecting suspect tissue to minimize irreversible tissue or other pathological damage caused by such disease.

(By "pathology" I mean any abnormality or disorder of a tissue, muscle, organ, etc. In using the term "tissue" in the above paragraph and throughout this disclosure, "tissue" means tissue, muscle, organ, etc.)

BACKGROUND OF THE INVENTION

Detection of diseased tissue by other than histological or biochemical means is a challenge for non-invasive imaging techniques. Pathologies of organ, muscle and tissue, such as various forms of cardiomyopathy, represent a group of diseases in which a non-invasive imaging technique to distinguish normal from abnormal tissue would be of particular importance. Texture analysis of organs, muscles or tissue, such as myocardium, is an approach to tissue characterization based on the spatial distribution of amplitude signals within a region-of-interest (ROI). While I use ultrasound and myocardium as the tissue of interest to describe how to make and use my invention, the invention can be used for images obtained by other multi-dimensional non-invasive imaging techniques, and to study other tissues, such as skeletal muscle, liver, pancreas, kidneys, and arterial wall linings. My invention is especially suitable when only a small ROI is available for analysis, such as a 16×16 ROI, as it has been stated by others that statistical methods are less reliable for small ROI's as noise within the signal has a significant effect. However, my invention is also suitable for large ROI'S and, I speculate, is a better detector than statistical methods.

The characterization of myocardial tissue itself by ultrasound was attempted in 1957 where excised human hearts were used to distinguish infarcted from normal myocardium.

Other multi-dimensional non-invasive imaging techniques include magnetic resonance imaging (MRI), radionuclide imaging, and computer axial tomography (CAT Scan). Moreover, three-dimensional or higher order imaging may also be employed. However, in lieu of a two-dimensional wavelet transform, a three-dimensional wavelet should be substituted when a three-dimensional image is analyzed.

Methodologies to: characterize myocardium by ultrasound include quantitative estimates of frequency-dependent myocardial attenuation and backscatter (as referred to in Miller J G, Perez J E, Sobel B E, "Ultrasonic characterization of myocardium," *Progress in Cardiovascular Diseases*, copyright September/October 1985; XXVIII (2):85–110, all of wich is incorporated herein by reference) and have been subsequently used to distinguishnormal from abnormal myocardium (as referred to in Masuyama T, Valantine H R, Gibbons R, Schnittger I, Popp R L, "Serial measurements of integrated ultrasonic backscatter in human cardiac allografts for the recognition of acute rejection," *Circulation*, copyright March 1990;81(3):829–839; Wickline S A, Thomas J L III, Miller J G, Sobel B E, Perez J E, "Sensitive detection of the effects of reperfusion on myocardium by ultrasonic tissue characterization with integrated backscatter," *Circulation*, copyright 1986;74:389–400; Sagar, K B, Rhyne T L, Pelc L R, Warltier D C, Wann L S, "Intramyocardial variability in integrated backscatter: effects of coronary occlusion and reperfusion," *Circulation*, copyright 1987;75:436–442; and, Sagar K B, Pelc L R, Rhyne T L, Komorowski R A, Wann L S, Warltier D C, "Role of ultrasonic tissue characterization to distinguish reversible from irreversible myocardial injury," *JASE*, copyright November/December 1990;3(6):471–477, all of which is incorporated herein by reference).

For the purposes of the present invention, the definition of image texture is "an attribute representing the spatial arrangement of the gray levels of the pixels in a region" (as referred to in "IEEE Standard Glossary of Image Processing and Pattern Recognition Terminology," *IEEE Press*, copyright Mar. 26, 1990; 7.14, all of which is incorporated herein by reference). Tissue pathology which changes microscopic anatomical structure changes myocardial ultrasound texture (speckle), and echocardiographic texture does contain tissue structure related information (as referred to in Smith S W, Wagner R F, "Ultrasound speckle size and lesion signal to noise ratio: verification of theory," *Ultras Imag*, copyright 1984; 6:174; and, Wagner R F, Smith S F, Sandrick J M, Lopez H, "Statistics of speckle in ultrasound B-scans," *IEEE Trans Sonics Ultras*, copyright May 1983; 30(3):186–163, all of which is incorporated herein by reference).

Attempting to numerically quantitate texture has been generally problematic with respect to the myocardium and, I speculate with respect to other organs, muscles and tissue. Quantization of texture using statistical techniques has been performed to identify various cardiomyopathic abnormalities, including myocardial contusion (as referred to in Skorton D J, Collins S M, Nichols J, Pandian N G, Bean J A, Kerber R E, "Quantitative texture analysis in two-dimensional echocardiography: application to the diagnosis of experimental myocardial contusion," *Circulation*, copyright July 1983;68(1):217–223, all of which is incorporated herein by reference), amyloid infiltration (as referred to in Pinamonti B. Picano E, Ferdeghini E M, Lattanzi F, Slavich G, Landini L, Camerini F, Benassi A, Distante A, L'Abbate A, "Quantitative texture analysis in two-dimensional echocardiography: application to the, diagnosis of myocardial amyloidosis," *JACC*, copyright September 1989; 14(3):666–671, all of which is incorporated herein by reference) hypertrophic cardiomyopathy (as referred to in Chandrasekaran K, Aylward P E, Fleagle S R, Burns T L, Seward J B, Tajik A J, Collins S M, Skorton D J, "Feasibility of identifying amyloid and hypertrophic cardiomyopathy with the use of computerized quantitative texture analysis of clinical echocardiographic data," *JACC*, copyright Mar. 15, 1989;13(4):832–840, all of which is incorporated herein by reference), coronary ischemia (as referred to in Picano E, Faletra F, Marini C, Paterni M, Danzi G B, Lombardi M, Campolo L, Gigli G, Landini L, Pezzano A, Distante A, "Increased echodensity of transiently asynergic myocardium in humans: a novel echocardiographic sign of myocardial ischemia," *JACC*, copyrights January 1993;21(1):199–207, all of which is incorporated herein by reference), myocardial non-viability (as referred to in Marini C, Picano E, Varga A, Marzullo P, Pingitore A, Paterni M, "Cyclic variation in myocardial gray level as a marker of viability in man: a videodensitometric study," *Eur Heart J*, copyright March 1996;17:472–479, all of which is incorporated herein by reference), transplant rejection (as referred to in Stempfle H, Angermann C E, Kraml P, Schutz A, Kemkes B M, Theisen K, "Serial changes during acute cardiac allograft rejection: quantitative ultrasound tissue analysis versus myocardial histologic findings," *JACC*, copyright July 1993;22(1) 310–317, all of which is incorporated herein by reference) and myocarditis (as referred to in Ferdeghini E M, Pinamonti B, Picano E, Lattanzi F, Bussani R, Slavich G, Benassi A, Camerini F, Landini L, L'Abbate A, "Quantitative texture analysis in echocardiography: application to the diagnosis of myocarditis," *J Clin Ultrasound*, copyright June 1991;19:263–270, all of which is incorporated herein by reference). These published reports used first- or second-order gray level histogram statistics for evaluation (usually 8-bit information), including mean gray level, standard deviation of the mean, skewness (deviation of the pixel distribution from a symmetrical shape), and the kurtosis (steepness of the pixel distribution).

The above-described statistical methods used for quantization of myocardial texture have limited capability. Data content for analysis was diminished in most of these studies because they were performed with digitized video signals for analysis. In addition, the ROI was relatively small (~16×16 pixel matrix) in order to avoid specular reflections (endocardial and epicardial borders). This small ROI limits the capability of statistical methodologies because of inherent noise in the image and a relatively small ROI to work with, making statistical methods less helpful.

I speculate that these identified problems with obtaining an image, and using statistical methods for relatively small ROI's as are available, led to the difficulties in these becoming accepted methods for analysis, as such statistical methods do not work reliably.

One-dimensional wavelets are used in analysis of various time domain signals including evoked potentials (as referred to in Bertrand O, Bohorquez J, Pernier J, "Time frequency digital filtering based on an invertible wavelet transform: An application of evoked potentials," *IEEE Trans on Biomedical Engineering*, copyright January 1994; 41(1):77–88, all of which is incorporated herein by reference), heart rate variability analysis (as referred to in Gamero L G, Risk M, Sobh J F, Ramirez A J, Saul J P, "Heart rate variability analysis using wavelet transform," *IEEE Computers in Cardiology*, copyright 1996:177–180, all of which is incorporated herein by reference), and ventricular late potentials (as referred to in Batista A, English M, "A multiresolution wavelet method for characterization of ventricular late potentials," *IEEE Computers in Cardiology*, copyright 1996:625–628; Meste O, Rix H, Caminal P, Thakor N V, "Ventricular late potentials characterization in time-frequency domain by means of a wavelet transform," *IEEE Transactions on Biomedical Engineering*, copyright July 994; 41(7):625–634, all of which is incorporated herein by reference). Two-dimensional wavelets are used for image compression (as referred to in Press W H, Teukolsky S A, Vetterling W T, Flannery B P, "Numerical recipes in FORTRAN: The art of scientific computing," $2_{nd}$ ed. *New York: Cambridge University Press*, copyright 1992:596–597; Chui C K, "Wavelets: A mathematical tool for signal analysis," *Philadelphia: Society for Industrial and Applied Mathematics*, copyright 1997: 178–180; Wickerhauser M V, "Adapted wavelet analysis from theory to software," *Wellesley, Massachusetts: A K Peters*, copyright 1994:361–377, all of which is incorporated herein by reference), and also quantization of texture of various surfaces (as referred to in Prasad L, Lyengar S S, "Wavelet analysis with applications to image processing," *Boca Raton: CRC Press, LLC*, copyright 1997:235–239, 258–262, all of which is incorporated herein by reference), texture analysis in remote sensing (as referred to in Mecocci A, Gamba P, Marazzi A, Barni M, "Texture segmentation in remote sensing images by means of packet wavelets and fuzzy clustering," *International Society of Optical Engineering, Synthetic aperture radar and passive microwave sensing*, copyright 1995:2584:142–151, all of which is incorporated herein by reference), and ultrasound texture analysis for characterization of fat content and marbling in beef cattle muscle (as referred to in Kim ND, Main V, Wilson D, Rouse G, Upda S, "Ultrasound image texture analysis for characterizing intramuscular fat content of live beef cattle," *Ultrasonic imaging*, copyright 1998; 20:191–205, all of which is incorporated herein by reference). Using the discrete wavelet transform (DWT), the approximation coefficients have been used for image compression, while detail coefficients of the wavelet deomposition correspond to texture information (as referred to in Prasad, L, Lyengar S S, "Wavelet analysis with applications to image processing," *Boca Raton: CRC Press*, copyright 1997:235–239, 258–262, all of which is incorporated herein by reference).

Recently, Mojsilovic et al. (as defined hereinafter) and Neskovic et al. (as defined hereinafter) used the two-dimensional Haar wavelet transform with an image extension method and wavelet decomposition to calculate texture energy, and differentiate viable from non-viable, myocardium (as referred to in Mojsilovic A, Popovic M V, Neskovic A N, Popovic A D, "Wavelet image extension for analysis and classification of infarcted myocardial tissue," *IEEE Transactions on Biomedical Engineering*, copyright September 1997; 44(9):856–866; and Neskovic A N, Mojsilovic A, Jovanovic T, Vasiljevic J, Popovic M, Marinkovic J, Bof ic M, Popovic A D. "Myocardial tissue characterization after acute myocardial infarction with wavelet image decomposition: a novel approach for the detection of myocardial viability in the early post infarction period,"*Circulation*, copyright Aug. 18, 1998; 98:634–641, all of which is incorporated herein by reference). However, the present invention differs from Neskovic et al. and Mojsilovic et al. in that my wavelet decomposition method and analysis does not use an image extension technique or a distance function. Moreover, unlike previous studies, the present invention utilizes a digitized "raw" ultrasound image signal obtained immediately after the digital scan conversion. In other words, the present invention utilizes the digitized "raw" ultrasound image signal from the digital scan converter which converts the polar coordinate format of the radio frequency ultrasound image signal to rectangular coordinates. Thus, such digitized "raw" ultrasound image signal has not been subjected to image processing for video display. Such image processing techniques for smoothing or otherwise enhancing the images for video display are known in the trade.

Moreover, it should be further noted, that Neskovic et al., using the Haar wavelet transform with an image extension method and wavelet decomposition, found through thorough mathematical analysis that the energy of the vertical edge image ($f^{LH}$) (a/k/a the horizontal detail coefficient) is the most reliable predictor of myocardial texture for the purpose of differentiating viable, myocardium from that of myocardial necrosis. Neskovic, et al. used a distance function to show these effects. More specifically, Neskovic et al. relied on the findings of Mojsilovic et al. whereby Mojsilovic et al. state that "the energy $e^{LH}$ is consistently the best feature for any level of decomposition. Since the measure $e^{LH}$ represents the energy distribution of vertical edges, this indicates that the changes in myocardial tissue structure are greatest in the horizontal direction, whereas, almost no difference can be observed in the vertical direction."

Furthermore, Neskovic et al. concluded that since an ultrasound image (echocardiogram) is by its very nature of relatively poor quality and that ultrasound noise is a random phenomenon essentially affecting the corner image ($f^{HH}$) having the highest frequencies, Neskovic et al. argued that the corner image ($f^{HH}$) having the highest frequencies should not be used.

In marked contrast to Neskovic et al., I have determined through further experimentation (described herein in detail below) that significant textural information can be derived from the corner image ($f^{HH}$) (a/k/a the diagonal detail coefficient). In contrast to Neskovic et al. my preliminary animal studies suggest that the energy of the vertical edge image ($f^{LH}$) (a/k/a the horizontal A detail coefficient) was the least sensitive of all the detail coefficients.

It appears, as opposed to Neskovic et al. and Mojsilovic et al., which found only the vertical edge (horizontal image) with a distance function (and not the texture measures directly), that direct textural energy from each set of detail coefficients—vertical (v), horizontal (H), diagonal (D) and the sum of (H+V), and the sum of (H+V+D)—may be useful. Moreover, reperfusion was not determined by Neskovic et al. from the texture measures directly but by using a distance function.

I have discovered that, while the energy of the vertical edge image ($f^{LH}$) (a/k/a the horizontal detail coefficient) approached significance in its ability to differentiate experimental groups (p≅0.07), the energy of the horizontal edge image ($f^{HL}$) (a/k/a vertical detail coefficient); the energy of the corner image ($f^{HH}$) (a/k/a the diagonal detail coefficient); the sum of the energies of the vertical detail coefficient and the horizontal detail coefficient; and, the sum of the energies of the vertical detail coefficient, the horizontal detail coefficient and the diagonal detail coefficient are significant in their ability to statistically discriminate groups (Table II).

As will be seen more fully below, the present invention is substantially different in methodology and approach from that of the prior detection methods for tissue image texture analyzing or characterization.

SUMMARY OF THE INVENTION

The preferred embodiment of the method and apparatus of the present invention solves the aforementioned problems in a straight forward and simple manner.

Broadly, what is provided is a method and apparatus for the early detection of tissue pathology using a wavelet decomposition method on tissue data obtained by using a non-invasive imaging technique. Such method and apparatus provide a tool for physicians and researchers to diagnose and thus treat early stages of diseases affecting suspect tissue to minimize irreversible tissue or other pathological damage caused by such disease.

More specifically, what is provided is a method and apparatus to detect early stages of cardiomyopathy using a wavelet decomposition method using a non-invasive imaging technique whereby such method and apparatus provides a tool for physicians and researchers to diagnose and thus treat early stages of cardiomyopathy affecting the myocardium to minimize irreversible myocardium damage.

Moreover, what is provided is a method and apparatus to detect early textural changes in an image of tissue or muscle using a wavelet decomposition method without the need for an image extension algorithm and/or distance function.

In view of the above an object of the present invention is to provide a tissue pathology detection apparatus which comprises a pathological tissue texture quantifier apparatus using wavelet decomposition to decompose an image of the tissue and a tissue pathology evaluator which compares a quantified decomposed image of the tissue with a standard reference model related to such tissue.

Broadly, the pathological tissue texture quantifier apparatus for use with a computing device comprises: a wavelet decomposer to decompose a region-of-interest of an ultrasound image of anatomical tissue into vertical, horizontal and diagonal detail coefficients; a wavelet energy calculator to calculate the energy content for each of said vertical detail coefficient, said horizontal detail coefficient and said diagonal detail coefficient of said region-of-interest of said ultrasound image of anatomical tissue; a wavelet energy summer to sum the energy contents of said vertical detail coefficient, said horizontal detail coefficient and said diagonal detail coefficient of said region-of-interest (ROI) of said ultrasound image of anatomical tissue; and, a wavelet normalizer to calculate a normalized energy content for each of said vertical detail coefficient, said horizontal detail coefficient and said diagonal detail coefficient of said region-of-interest (ROI) and a normalized energy content for said sum of said energy contents of said vertical detail coefficient, said horizontal detail coefficient and said diagonal detail coefficient.

While the wavelet decomposer also produces the approximation coefficients, I do not use the approximation coefficients in my invention.

Another object of the present invention is to provide a pathological tissue texture quantifier apparatus with a wavelet energy summer wherein said wavelet energy summer further sums the energy contents of said vertical detail coefficient and said horizontal detail coefficient of said region-of-interest (ROI) of said ultrasound image of anatomical tissue; and, wherein said wavelet normalizer further calculates a normalized energy content for said energy contents of said vertical detail coefficient and said horizontal detail coefficient.

It is a further object of the present invention to provide a pathological tissue texture quantifier apparatus which calculates said energy content of each of said vertical, horizontal and diagonal detail coefficients in said region-of-interest (ROI) using the equation $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

It is a still further object of the present invention to provide a pathological tissue texture quantifier apparatus which normalizes said energy contents with an energy content of a non-decomposed image of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{oi}$=the pixel intensity value of the non-decomposed image of said region-of-interest (ROI).

It is still a further object of the present invention to provide a tissue pathology detection apparatus having a tissue pathology evaluator which comprises a standard reference model of energy content tissue references, for healthy and diseased or abnormal tissue, of vertical detail coefficients, horizontal detail coefficients and diagonal detail coefficients; energy content tissue references, for healthy and diseased or abnormal tissue, of normalized energy contents of each of said vertical, horizontal and diagonal detail coefficients; and, a comparer to compare said standard reference model with anatomical tissue.

It is a still further object of the present invention to provide a pathological tissue texture quantifier apparatus which uses the first level detail coefficients of a two-dimensional Haar wavelet decomposition transformation of said vertical, horizontal and diagonal detail coefficients.

It is a still further object of the present invention to provide a pathological tissue texture quantifier apparatus which is adapted to use a digitized "raw" ultrasound image file of an ultrasound image of said anatomical tissue.

It is a still further object of the present invention to provide a pathological tissue texture quantifier apparatus which is adapted to use a digitized image signal from other non-invasive imaging techniques including, without limitation, magnetic resonance imaging (MRI), computer axial tomography (CAT Scan) three-dimensional ultrasound imaging, B-mode duplex scan, nuclear magnetic resonance, and radionuclide imaging. Preferably, such digitized image signal is a digitized image signal which has not been enhanced through digital "raw" image processing or again converted to analog form (video) and then digitized again.

It is a still further object of the present invention to provide a pathological tissue texture quantifier apparatus which is adapted to quantify anatomical tissue such as muscle tissue and organ tissue of Homo sapiens and other mammals.

It is a still further object of the present invention to provide a pathological tissue texture quantifier apparatus which is adapted to detect early cardiomyopathy.

In view of the above, it is a still further object of the present invention to provide a method for quantifying pathological tissue texture comprising the steps of:(a) wavelet decomposing a region-of-interest of an ultrasound image of anatomical tissue into vertical, horizontal and diagonal detail coefficients; (b) calculating the energy content for each of said vertical detail coefficient, said horizontal detail coefficient and said diagonal detail coefficient of said region-of-interest of said ultrasound image of anatomical tissue; (c) summing the energy contents of said vertical detail coefficient, said horizontal detail coefficient and said diagonal detail coefficient of said region-of-interest (ROI) of said ultrasound image of anatomical tissue; (d) normalizing each of the energy contents for each of said vertical detail coefficient, said horizontal detail coefficient and said diagonal detail coefficient of said region-of-interest (ROI); and, (e) normalizing said sum of said energy contents of said vertical detail coefficient, said horizontal detail coefficient and said diagonal detail coefficient.

It is a still further object of the present invention to provide a method for quantifying pathological tissue texture wherein said step of (c) further comprises the step of: (c1) summing the energy contents of said vertical detail coefficient and said horizontal detail coefficient of said region-of-interest (ROI) of said ultrasound image of anatomical tissue.

It is a still further object of the present invention to provide a method for quantifying pathological tissue texture wherein said step of (e) further comprises the step of: (e1) normalizing the sum of the energy contents of said vertical detail coefficient and said horizontal detail coefficient.

It is a still further object of the present invention to, provide a method for quantifying pathological tissue texture further comprising the step of: (f) comparing said anatomical tissue with a standard reference model of energy content tissue. references.

Furthermore, an object of the present invention is to provide a method and apparatus which is adapted to process conventional echocardiographic image signals of animal (including human) tissue in order to detect minor changes in intracellular structure.

A still further object of the present invention is to provide a method and apparatus which processes the digitized "raw" ultrasound image signal of a two-dimensional echocardiographic image, or, in other words, a rectangular coordinate array of pixels, which exists prior to the digital image processing which is typically necessary for video display of an echocardiographic image.

It is a still further object of the present invention to provide a method and apparatus which creates a plurality of first level detail coefficients using the Haar two-dimensional wavelet decomposition method without an image extension algorithm and/or distance function used therewith.

It is a still further object of the present invention to provide a method and apparatus which creates a plurality of first level detail coefficients using the two-dimensional wavelet decomposition method without an image extension algorithm and/or distance function used therewith.

It is a still further object of the present invention to provide a method and apparatus for detecting tissue pathology by other than histological or biochemical means while still using non-invasive imaging techniques.

It is a still further object of the invention to provide a method and apparatus for cataloging normal tissue and abnormal or diseased tissue for later use as a reference.

It is still a further object of the invention to provide a tool for enhancing patient care.

It is still a further object of the invention to provide a tool for enhancing the clinical study of various pathologies.

It is a still further object of the invention to provide a method and apparatus for cataloging normal tissue and abnormal or diseased tissue for later use as a reference.

Given that patients receive routine-frequent heart biopsies to screen for early heart transplant rejection, it is a further object of my invention to non-invasively detect early heart transplant rejection.

Given that patients receive routine-frequent pancreas biopsies to screen for early pancreas transplant rejection, it is a further object of my invention to non-invasively detect early pancreas transplant rejection.

Given that patients receive routine-frequent organ biopsies to screen for early organ transplant rejection, it is a further object of my invention to non-invasive detect early organ transplant rejection Given that some drugs used to treat malignancies will cause the heart to dilate and subsequently cause heart failure, it is a still further object of my invention to provide for early detection of cardiomyopathy and, particularly, before such cardiomyopathy is irreversible.

The above and other objects of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
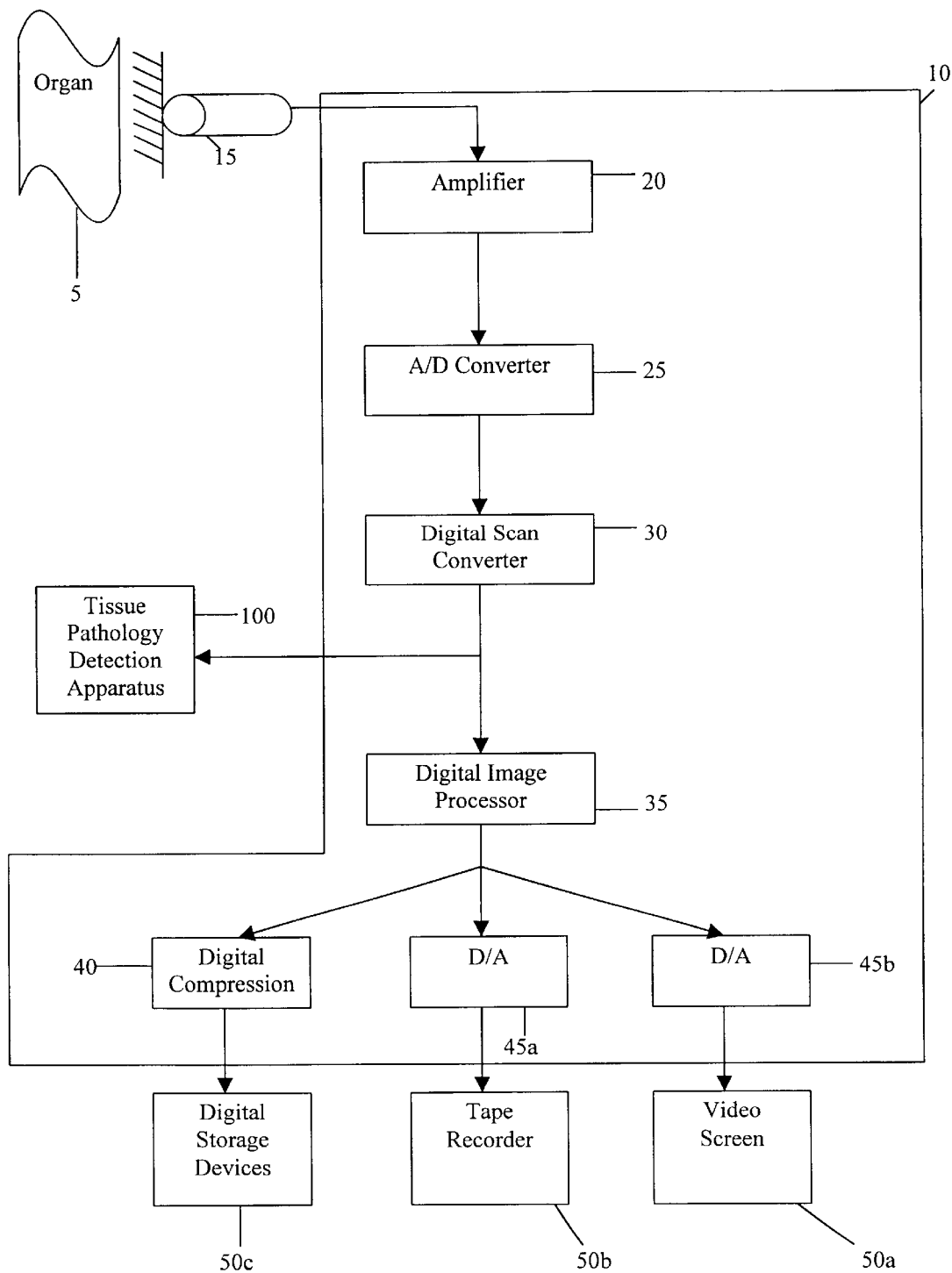
FIG. 1 illustrates the apparatus for the early detection of tissue pathology, such as cardiomyopathy, of the present invention employed with a echocardiography machine; and, FIG. 2 illustrates a general block diagram of the apparatus for the early detection of tissue pathology, such as cardiomyopathy, of the present invention.

Referring now to the drawings, and in particular FIG. 1, the apparatus for the early detection of tissue pathology, such as cardiomyopathy, is designated by the numeral 100 (hereinafter referred to as "tissue pathology detection apparatus 100"). In the exemplary embodiment, tissue pathology detection apparatus 100 is adapted to be interfaced with conventional echocardiography (echo) machine 10, other ultrasound imaging devices and other non-invasive imaging devices. Since the echo signal processing components and the digital imaging processing have been well established, echo machine 10 will be described only briefly.

Broadly, conventional echo machine 10 is comprised of amplifier 20 which is adapted to receive an analog ultrasound signal from ultrasound transducer 15. After amplification by the amplifier 20, the analog ultrasound signal is converted to a digital signal via a analog-to-digital (A/D) converter 25. Thereafter, digital scan converter 30 digitizes the digital signal from A/D converter 25.

In general, digital scan converter 30 performs digitization which can be performed at almost any stage. However, it should be noted that the output from digital scan converter 30 is considered a "raw" ultrasound image signal. In the exemplary embodiment, such "raw" ultrasound image signal is a two-dimensional echocardiographic image. Nevertheless, other non-invasive imaging techniques such as magnetic resonance imaging (MRI), computer axial tomography (CAT Scan), three-dimensional ultrasound imaging, radionuclide imaging may be substituted. Preferably, such digitized image signal is a digitized "raw" image signal which has not been enhanced through a smoothing function or other digital image processing.

More specifically, digital scan converter 30 changes the image from a polar acquisition format (polar coordinates) of the sector scan by ultrasound transducer 15 to a rectangular grid or array (rectangular coordinates). Such conversion provides an output which is compatible with standard video output for display on video screen 50a after being converted back to an analog signal via digital-to-analog converter 45b. However, the output of the digital scan converter 30 typically requires digital image processing via well established digital image processing algorithms 35.

Typically, echo machine 10 provides for recording of the output signal from digital image processing algorithms 35 on tape recorder 50b via digital-to-analog (D/A) converter 45a and/or storage on a computer readable memory medium 50c through the use of digital compression algorithms 40.

Figure 2:
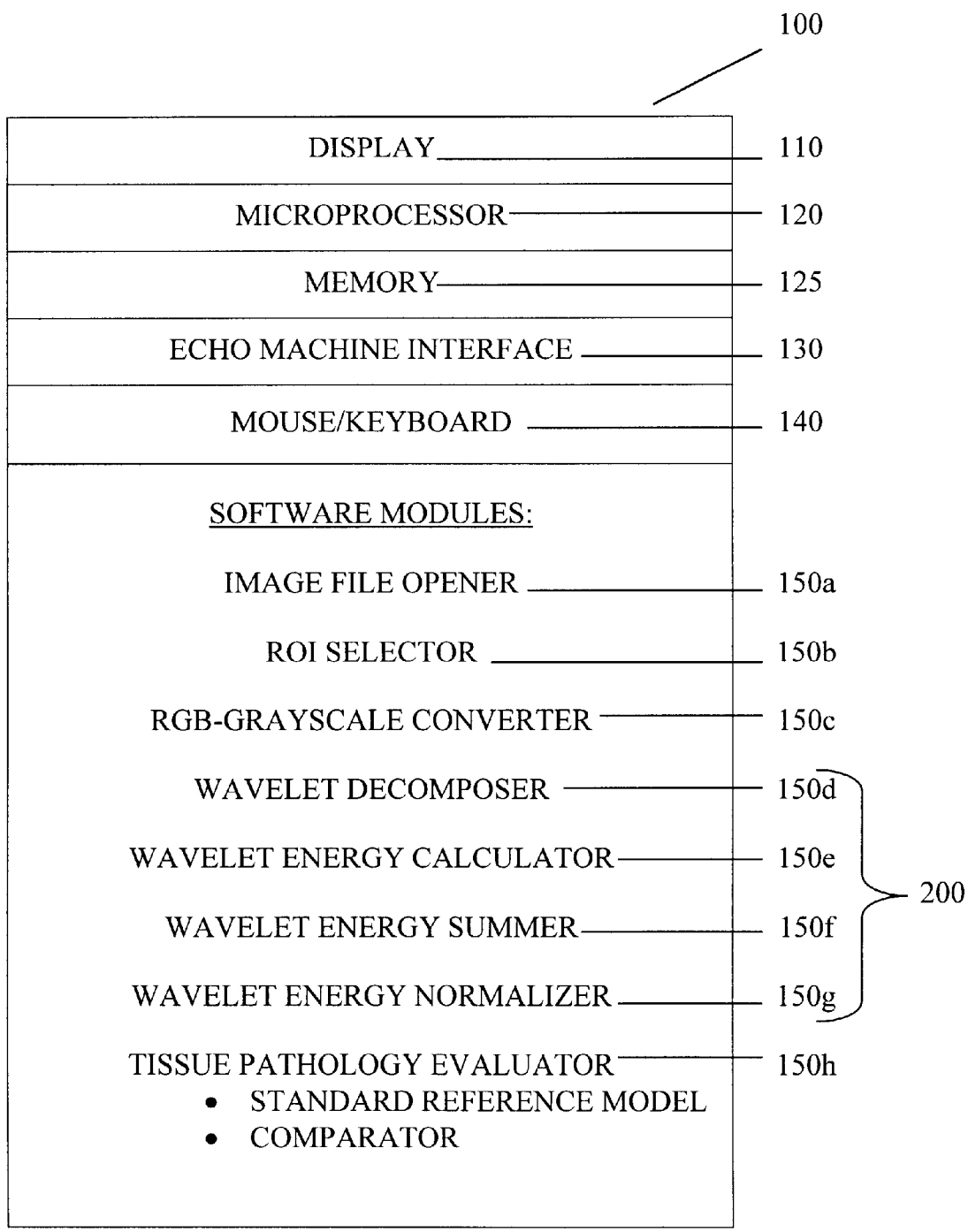

Referring now to FIG. 2, tissue pathology detection apparatus 100 is comprised of a general computing device, such as without limitation a personal computer, laptop, or the like, having display 110, microprocessor 120, an interface 130 for connection to echo machine 10, other ultrasound imaging device or other non-invasive imaging device, memory 120 and mouse and/or keyboard accessories 140 to provide for data entry, navigation, and selectivity. Since the hardware components of personal computers and laptops and the operation thereof are well established no further details will be described. Furthermore, the block diagram in FIG. 2 is an exemplary embodiment of the computing device since conventional computing devices are capable of multimedia data operation.

Nevertheless, while tissue pathology detection apparatus 100 is illustrated as a separate and distinct entity from echo machine 10, components of tissue pathology detection apparatus 100 maybe integrated into the design of future echo machines, other ultrasound imaging devices or other non-invasive imaging device.

Tissue pathology detection apparatus 100 further comprises a plurality of software modules 150a, 150b, 150c, 150d, 150e, 150f, 150g and 150h for processing the digitized "raw" ultrasound image signal and an operating system (not shown). In the exemplary embodiment, the digitized "raw" ultrasound image signal is electrically communicated to tissue pathology detection apparatus 100 in a DEFF file format. Such digitized "raw" ultrasound image signal will sometimeshereinafter be referred to as the "original signal." The DEFF file is opened via image file opener 150a. In the exemplary embodiment, image file opener 150a is capable of opening and converting the DEFF file format to a TIFF file. In general, the image file opener 150a must be compatible with the original signal. Paint Shop Pro, Version 5, by Jasc Software, copyright 1998 is one such example of an image file opener. Nevertheless, other compatible software packages, preferably, commercially readily available, may be substituted.

In the exemplary embodiment, the TIFF file is in a (red-green-blue) RGB format. The image file opener 150a of the exemplary embodiment includes a ROI selector 150b which provides for selecting a region-of-interest ROI for observation and evaluation to detect cardiomyopathy. The ROI has a predetermined two-dimensional pixel resolution preferably of 16×16. Nevertheless, other two-dimensional pixel resolutions can be substituted. In some instances a two-dimensional pixel resolutionlarger than 16×16 may be desired.

The selected ROI in the RGB format is converted to a grayscale format, such as an 8-bit grayscale, using RGB-grayscale converter 150c. In the exemplary embodiment, the RGB-grayscale converter 150c is provided by the software package MATLAB, Version 5, by The Mathworks, Inc. After, the selected ROI is converted to a grayscale format, the ROI image having a two-dimensional pixel resolution can be processed using a two-dimensional wavelet decomposition method which provides for decomposition thereof. When analyzing a two-dimensional signal, there are three sets of detail coefficients generated, horizontal H (vertical edge image), vertical V (horizontal edge image), and diagonal D (corner image). Moreover, an approximation coefficient is generated. The process of forming the approximation and detail coefficients from the original signal or in this instance the ROI image is termed wavelet decomposition. The Haar wavelet is one of the simplest types of wavelets. Nevertheless, the MATLAB software package provides a plurality of wavelet decomposition method types. The Haar wavelet resembles a step function which I chose because it is the simplest wavelet and while, not wishing to be bound by theory, it appears to approximate textural information with its step function. (For general information on wavelets and the Haar wavelet, see, *A Primer on Wavelets and Their Scientific Applications* by James S. Walker, copyright 1999, by Chapman & Hall/C.R.C. New York, all of which is incorporated herein by reference.)

For many applications (signal and image compression), the approximation coefficients are most important, whereas the detail coefficients contain noise and artifact, but also textural information. The approximation coefficients may be further a resolved into a second level set of approximation and detail coefficients. This process may theoretically continue until only a single value for the approximation and detail coefficients remain, but I speculate that there is no information gained by decomposing a signal that far.

In general, wavelet decomposer 150*d* uses two-dimensional wavelet decomposition method which filters (decomposes) the image into four components or orientations, as provided by the MATLAB. The nomenclature is as follows:

| | |
|---|---|
| $f^{LL}$ - base image | (approximation coefficient used in digital image compression techniques) |
| $f^{LH}$ - vertical edge image | (the "horizontal" detail coefficient or H) |
| $f^{HL}$ - horizontal edge image | (the "vertical" detail coefficient or V) |
| $f^{HH}$ - corner image | (the "diagonal" detail coefficient or D) |

In the preferred embodiment, since the horizontal, vertical, and diagonal detail coefficients H, V and D are first level detail coefficients of the Haar two-dimensional wavelet decomposition method the nomenclature H1, V1 and D1 is used for such distinction. Wavelet energy calculator 150*e* calculates the energy of the non-decomposed ROI image, the horizontal detail coefficient H1, the vertical detail coefficient V1 and the diagonal detail coefficient D1 for a selected ROI using $$E_z = (1/N) * \sum_{i=1}^{N} |I_{zi}^2| \qquad \text{Eq (1)}$$

wherein z=O, H1, V1, or D1; i=is the number of the pixel from 1 to N wherein N=the number of pixels within the ROI image; and $I_{zi}$=the pixel intensity value for any one of O, H1, V1, or D1. The O represents the non-decomposed ROI image or, in other words, the ROI image prior to decomposition by the Haar two-dimensional wavelet decomposition method.

Alternately, equation Eq (1) may be substituted with $$E_z = (1/N) * \sum_{i=1}^{N} |I_{zi}|. \qquad \text{Eq (1a)}$$

Wavelet energy summer 150*f* sums the energies of horizontal detail coefficient H1, the vertical detail coefficient V1 and the diagonal detail coefficient D1 whereby $E_{sum1}$ and $E_{sum2}$ are defined by $$E_{sum1} = E_{V1} + E_{D1} \qquad \text{Eq. (2)}$$

$$E_{sum2} = E_{H1} + E_{V1} + E_{D1}. \qquad \text{Eq. (3)}$$

Wavelet energy normalizer 150f is capable of normalizing each of the energies $E_{H1}$, $E_{V1}$, $E_O$, $E_{sum1}$ and $E_{sum2}$ with the energy $E_O$ of the non-decomposed ROI image.

More specifically, tissue pathology detection apparatus 100 comprises pathological tissue texture quantifier apparatus 200, which is generally comprised of software modules 150*d*, 150*e*, 150*f* and 150*g*, and tissue pathology evaluator 150*h*. The software modules 150*a*, 150*b*, and 150*c* are primarily used to allow the computing device to accept and convert the echocardiography image or other ultrasound image file for processing by pathological tissue texture quantifier apparatus 200. Pathological tissue texture quantifier apparatus 200 is adapted to quantify anatomical tissue such as muscle tissue and organs of mammals, including Homo sapiens.

Tissue pathology evaluator 150*h* includes a standard reference model of the energies $E_{H1}$, $E_{V1}$, $E_D$, $E_{sum1}$ and $E_{sum2}$ for various types of diseased and/or healthy tissue, muscles, and organs for comparison to detect and thus diagnose pathology or stages thereof. Moreover, the standard reference model of tissue pathology evaluator 150*h* may many contain the normalized values of the energies $E_{H1}$, $E_{V1}$, $E_D$, $E_{sum1}$ and $E_{sum2}$ for diseased and/or health tissue. In the exemplary embodiment, tissue pathology evaluator 150*h* includes a standard reference model of the energies $E_{H1}$, $E_{V1}$, $E_D$, $E_{sum1}$ and $E_{sum2}$ for various types of cardiomyopathy and/or healthy myocardium for comparison to detect and thus diagnose cardiomyopathy. Moreover, the standard reference model of tissue pathology evaluator 150*h* may contain the normalized values of the energies $EH_{H1}$, $E_{V1}$, $E_D$, $E_{sum1}$ and $E_{sum2}$ for various types of cardiomyopathy and/or healthy myocardium.

It should be noted that the MATLAB software package includes various mathematical functions which are adapted to be used to independently program equations for calculating the energies $E_{H1}$, $E_{V1}$, $E_D$, $E_{sum1}$ and $E_{sum2}$, as well as, the normalized values thereof. While the exemplary embodiment uses the MATLAB software package, other compatible software packages or tailorized programs may be substituted to perform the desired calculations set forth herein. Moreover, the functionality of software modules 150–150*h* may be integrated into a single logic program.

The method of detecting and diagnosing early stages of cardiomyopathy includes the following:

(1) performing an echocardiograph procedure on an end-diastolic heart, wherein an end-diastolic heart is a relaxed heart, to obtain a two-dimensional echocardiographic image;

(2) obtaining a digitized "raw" ultrasound image signal of said two-dimensional echocardiographic image;

(3) selecting a region-of-interest (ROI) having a predetermined two-dimensional pixel resolution from said digitized "raw" ultrasound image signal;

(4) converting said digitized "raw" ultrasound image signal to a grayscale image;

(5) decomposing the selected ROI image using a two-dimensional wavelet decomposition method;

(6) calculating an energy content of the approximation coefficient and each first level detail coefficient of a plurality of different first level detail coefficients (i.e., $E_{H1}$, $E_{V1}$ and $E_{D1}$) of the selected ROI; and, (7) comparing $E_{H1}$, $E_{V1}$, $E_{D1}$ with a standard reference model in order to differentiate normal from abnormal tissue.

In addition to the above method steps for detecting early cardiomyopathy, the method further includes the steps of calculating the energy of $E_{sum1}$ and $E_{sum2}$ wherein $E_{sum1}$= $E_{V1}$+$E_{D1}$ and the $E_{sum2}$=$E_{H1}$+$E_{V1}$+$E_{D1}$ of the selected ROI; and, comparing the calculated $E_{sum1}$ and $E_{sum2}$ with a standard reference model.

In addition to the above method steps for detecting early cardiomyopathy, the method further includes the step normalizing the energy of each detail coefficient of the plurality of coefficients with the energy $E_0$ of the non-decomposed ROI image. While not wishing to be bound by theory, it is believed that the advantageous results of the invention are obtained because enhanced tissue differentiation can be obtained earlier by performing such additional step of normalizing.

Moreover, while not wishing, to be bound by theory, the advantageous results of the invention are obtained because of the comparison of $E_{sum2}=E_{H1}+E_{V1}+E_{D1}$ using the diagonal detail coefficient D1 previously thought to be laden with noise and high frequency distortion.

Moreover, while not wishing to be bound by theory, the advantageous results of the invention are obtained because the echocardiograph is performed on an end-diastolic heart or, in other words, a relaxed heart. It should be noted that the echocardiography performed during the Experiments 1 and 2 on the test subjects, set forth below, were during end-diastole. However, in addition to the echocardiography performed during Experiments 1 and 2, the echocardiograph was performed during end-systole. However, the calculations of the energies $E_{H1}$, $E_{V1}$, $E_{D1}$, $E_{sum1}$ and $E_{sum2}$, as well as, the normalized energies did not produce statistically viable information.

In the preferred embodiment, the two-dimensional echocardiographic images are M-mode images of animal tissue or human tissue. Furthermore, the digitized "raw" ultrasound signal is captured immediately after digital scan conversion of the radio frequency ultrasound signal. In other words, the digitized "raw" ultrasound signal has not been otherwise subjected to or enhanced by digital image processing for video display.

In the preferred embodiment, the ROI is a relatively small region for observation and has a predetermined two-dimensional pixel resolution of substantially 16×16 pixel resolution. It should be noted that, in the experiments set forth below, only a 16×16 pixel resolution of the ROI could be evaluated. I would prefer a larger pixel resolution of the ROI, but the rodent's heart is very small. Thus, a 16×16 pixel resolution is all that could be used for the experiment. Moreover, the grayscale conversion uses an 8-bit grayscale format.

Additionally, in the preferred embodiment, the two-dimensional wavelet decomposition method uses a two-dimensional Haar wavelet decomposition method.

In the preferred embodiment, step (1) further includes creating the two-dimensional echocardiographic image in the parasternal short axis at the level of the papillary muscles during end-diastole. I speculate it may be best to be as close to the transducer as possible. Hence, the intracellular structure and thus changes in the heart muscle can be readily identified. Moreover, when creating the two-dimensional echocardiographic image, I think it best to avoid the endocardial and epicardial borders, in an effort to avoid specular reflections as this represents a "surface border"—and is not representative of what one should be observing.

While the above method is related to cardiomyopathy, other diseases and pathologies may be detected with the above method whereby performing an echocardiograph procedure in the step (1) would be substituted with performing a non-invasive imaging procedure on anatomical tissue. For example, anatomical tissue would include skeletal muscle, liver, pancreas, kidney, blood vessel linings, etc. Thus, the two-dimensional echocardiographic image would be a two-dimensional image derived from the non-invasive imaging procedure. Furthermore, the digitized "raw" ultrasound image signal would be a digitized "raw" image signal derived from the non-invasive imaging procedure having not been subjected to or enhanced by digital image processing.

Experimentation

Introduction

To improve early detection of cardiomyopathy non-invasively, the texture of myocardial echocardiographic images was characterized from controls (C), rats maintained on 4% (E4) (only in the 10-week experiment) and 12% (E12) ethanol, diabetic (D), and diabetic rats maintained on 4% ethanol (DE) wherein for the 5-week group, n=4/group and for the 10 week group n=5/group. Echos were digitally recorded with a Toshiba SSH-380 using a 10 MHZ phased array transducer. Parasternal short-axis images at the level of the papillary muscles were obtained in end-diastole. This image was downloaded in DEFF format to a laptop computer and converted to TIFF format. A 16×16 pixel ROI was selected and this converted to grayscale and then wavelet. Wavelet decomposition of the ROI was performed using the two-dimensional Haar transform. For each group, the ROIs $1^{st}$-order statistics (mean intensity, standard deviation and relative smoothness) were not statistically different. However, summation whether of either ($E_{sum1}$) or ($E_{sum2}$) of the $1^{st}$ level horizontal and vertical, or the first level horizontal, vertical and diagonal detail coefficients (i.e., total texture energy), or normalization thereof, was capable of differentiating groups. These results indicate that calculated texture energy using the two-dimensional Haar decomposition method can be useful in the early detection of diabetic cardiomyopathy and for monitoring its progression.

Rodent Models of Cardiomyopathy

Two groups of laboratory rats were used to perform two separate experiments (Experiments 1 and 2). Male Sprague-Dawley SPF rats (Charles River Laboratories, Wilmington, Ma.) weighing between 175–200 grams were used for each study. Rats were housed two per cage in a controlled-temperature (20–22° Celsius) room where they were exposed to a 12-hour light/dark cycle. Both groups of animals received food and either water or ethanol ad lib. Body weights were recorded on a weekly basis and fluid consumption was monitored in all groups for the duration of the study. The study was approved by the Louisiana State University Medical Center Institutional Animal Care and Use Committee.

Experiment 1: Test Subjects

Sixteen rats were randomly assigned to four groups (n=4/group): control (C), 12% ethanol (E12), diabetic (D), and diabetic maintained on 4% ethanol (DE4). Ethanol solutions were prepared on a v/v basis and were the sole source of fluid for E12 and DE4 groups while C and D groups received water. Rats in the diabetic group were injected with streptozotocin (45 mg/kg) prepared in a 0.02 M sodium citrate solution (pH 4.5) via a tail vein to induce diabetes mellitus. Rats assigned to all other groups were injected with a similar volume of sodium citrate solution. Glycosylated hemoglobin (total) was measured in tail-vein blood in all rats within two days of echocardiographic examination using a commercially available kit (Sigma Chemical Co, St. Louis, Mo.). All diabetic rats exhibited the clinical signs of polydipsia, polyuria, and polyphagia. A 4% ethanol solution was used in the diabetes plus ethanol group because diabetic animals consumed approximately three-times the volume of fluid per day compared with non-diabetic groups. Animals were studied 5-weeks post STZ-injection (4 weeks ethanol ingestion).

Experiment 2: Test Subjects

A second experiment was performed with rats at 10-weeks of induced disease (9-weeks ethanol ingestion). Groups were similar to the 5-week experiment but with the addition of a fifth group of non-diabetic rats (E4) that were given 4% (v/v) ethanol in their water supply. Twenty-five rats were used in this experiment with five animals in each group.

Echocardiography Methodoloqy

All animals were anesthetized with a solution of ketamine-xylazine (50-mg/kg ketamine, 4-mg/kg xylazine, intraperitoneal) and the thoracic and upper abdominal areas shaved prior to echocardiography. The rats were positioned on a table for M-mode and two-dimensional echocardiograms. Studies were performed with a Toshiba Model 380 Echocardiography instrument (Toshiba America Medical Systems, Tustin, Calif.) using a 10 MHZ transducer calibrated with phantoms prior to use. Lateral resolution less than 0.20 mm within the ROI is achieved at the imaging depths used.

M-mode recordings, using two-dimensional parasternal short axis guidance, were obtained at the level of the papillary muscles for measures of the end-diastolic interventricular septal dimension (IVSD), left ventricular end-diastolic dimension (LVD), and end-diastolic posterior wall dimension (PWD), following American Society of Echocardiography guidelines for M-mode measurements (as referred to in Sahn D J, DeMaria A N, Kisslo J, Weyman A E, "Recommendations regarding quantitation in M-mode echocardiography: results of a survey of echocardiographic measurements, Circulation 1978; 1072–1083, all of which is incorporated herein by reference,. End-diastole was defined, for experimental purposes, as the largest two-dimensional cross-sectional area, as end-diastole in the rodent model does not necessarily correlate with the electrocardiogram.

Analysis

For texture analysis, digitized "raw" ultrasound images were obtained immediately after the digital scan convertor 30. Gain settings were kept constant throughout the entire study. Two-dimensional echocardiographic images in the parasternal short axis, at the level of the papillary muscles, were digitally recorded in end-diastole. The (end-diastolic) digitized "raw" image was downloaded as an RGB (red-green-blue) signal in DEFF format to a laptop computer. The RGB pre-processed end-diastolic image was converted to a 8-bit grayscale pre-processed end-diastolic image and stored as a TIFF file such as via Paint Shop Pro. From the grayscale pre-processed end-diastolic image a 16×16 pixel ROI was selected in the anterior interventricular septum (IVS). Care was taken to only select myocardium for the ROI, excluding endocardial and epicardial borders, thus avoiding specular reflections.

Analysis of texture was performed using traditional statistical methods. These included measurement of the ROI's mean intensity, standard deviation of the mean, skewness, kurtosis, and relative smoothness (RS). RS is defined by $$RS=1-1/(1+V^2)$$

wherein V is the variance of ROI pixel intensity (as referred to in Gonzales R C, Woods R E; Digital image processing, Reading, Massachusetts: Addison-Wesley Publishing Company, copyright 1992:508, all of which is incorporated herein by reference).

Additionally, analysis of texture was performed using the same ROI quantization of myocardial texture, which was subjected to decomposition using the Haar wavelet decomposition. Thereafter, the equations Eq. (1), Eq. (2), Eq. (3) set forth above were used to calculate $E_{H1}$, $E_{V1}$, $E_{D1}$, $E_{sum1}$ and $E_{sum2}$.

More specifically, texture content information was obtained by calculating the energy content using equation Eq. (1) for the first level detail coefficients H1, V1 and D1 from the ROI image. Additionally, the summed energy content ($E_{sum1}$) of the horizontal and vertical detail coefficients (H1+V1), and also the summed energy content ($E_{sum2}$) of the horizontal, vertical and diagonal detail coefficients (H1+V1+D1) to yield energy within the detail coefficients were calculated.

Additionally, the calculated energies $E_{H1}$, $E_{V1}$, $E_D$, $E_{sum1}$ and $E_{sum2}$ were normalized to the energy content of the original (non-decomposed) ROI image energy $E_0$.

Myocardial Histology Process

In Experiment 2 (10-week), cardiac and renal tissues were harvested, rinsed in ice-cold physiologic saline, and then placed in 10% (v/v) formaldehyde solution in aqueous phosphate buffer (pH 7.4) (Mallinckrodt Inc., St. Louis, Mo.). Pancreatic tissue was harvested and fixed in buffered zinc-formaldehyde. Microscopic analysis were performed on H&E stained tissue slices.

Statistical Methods

A one-way analysis of variance was used to test for differences among the experimental groups. The Fisher's Protected LCD post hoc test was used to identify groups that were statistically different from each other. Statistical significance was accepted at a "p"≦0.05. Simple linear regression was used to determine the relationship between the variance of the image ROI pixel intensity and detail coefficients obtained from calculation of image energy, log energy, and Shannon's entropy (Ref) following wavelet decomposition. All data are reported as mean±SEM.

Induction of Diabetes

In Experiment 1, glycosylated hemoglobin (total) levels in normoglycemic groups were not statistically different and had combined means of 5.6±0.7%. Diabetic groups had similar glycosylated hemoglobin levels as well, with a combined mean of 10.8±1.1%. The levels of glycosylated hemoglobin were significantly greater than levels in non-diabetic animals (p≧0.001). Body weights at the time of echocardiographic examination were 315±15, 301±11, 298±16, 292±22 grams (g) for C, E12, D & DE4, respectively (p≧0.05). In Experiment 2, total glycosylated hemoglobin levels within non-diabetic (C, E4, E12) and diabetic groups (D, DE4) were again not different statistically and had combined means of 6.1±0.3% and 12.5±1.3%, respectively. Again, diabetic animals had significantly greater glycosylation levels compared with normoglycemic animals ($p \geq 0.001$). Group differences in body weights were observed at 10-weeks with both the D (315±24 g) and DE4 (295±16 g) groups weighing significantly less than the normoglycemic groups (623±30, 598±29 and 581±25 g for C, E4 and E12, respectively; $p \geq 0.001$). Although diabetic animals weighed less than their non-diabetic counterparts, they continued to gain weight during the experiment as can be seen when compared to initial start weights of 175–200 grams.

Ethanol

The 4% solution of alcohol in diabetic rats was equivalent to 12% alcohol in euglycemic rats, as diabetic animals drank approximately 3-times the amount consumed by euglycemic rats (118±5 ml/day vs. 32±3 ml/day, respectively). The amount of fluid consumed by diabetic rats maintained on water and diabetic rats on 4% alcohol was not statistically different.

Histology

Tissues from 10-week rats were analyzed using H&E staining. Both diabetic groups (D, DE4) showed marked loss of pancreatic islet beta cells (a single cell was observed in one D animal) while the euglycemic control and ethanol groups had the normal complement of beta cells. In addition, clear cells, indicative of glycogen deposition, were observed in the kidney in 80% of D and 60% of DE4 rats while none were observed in rats from any other group. It was noted that the myocardial IVS of all animals in the E4 and E12 groups had marked lymphocytic infiltrates on histologic examination. The degree of infiltration was evaluated qualitatively as none, few (1–4 cells per field), or marked infiltration. Only two control animals, and one diabetic (D) animal, had lymphocytic infiltrates (graded as few). The remaining animals in these groups did not show infiltrates, nor did any animal of the DE group.

EchocardiograDhic Analysis—M-mode Measurements

Analysis of M-mode echocardiographic data (IVSD, PWD, or LVD) revealed no statistically significant differences between groups in the 5-week experiment. However, significant differences were found with several measured M-mode parameters in the 10-week experiment (Table I). Ethanol-treated non-diabetic animals showed increases in IVSD and PWD at 10-weeks with the effects being most pronounced in animals on 12% ethanol. LVD was increased in diabetic animals on water, while PWD tended to be reduced in these animals and in diabetic rats maintained on 4% ethanol.

TABLE I

| | Myocardial M-Mode Measurements | | |
|---|---|---|---|
| | IVSD (cm) | PWD (cm) | LVD (cm) |
| Experiment 1 (5 Wks) | | | |
| Control | 0.120 ± 0.006 | 0.132 ± 0.007 | 0.455 ± 0.035 |
| Ethanol (12%) | 0.130 ± 0.007 | 0.150 ± 0.003 | 0.540 ± 0.027 |
| Diabetic | 0.118 ± 0.009 | 0.142 ± 0.010 | 0.507 ± 0.042 |
| Diabetic + 4% Ethanol | 0.120 ± 0.004 | 0.143 ± 0.005 | 0.455 ± 0.027 |
| ANOVA | $p \leq 0.564$ | $p \leq 0.202$ | $p \leq 0.444$ |
| Experiment 2 (10 Wks) | | | |
| Control | 0.117 ± 0.008 | 0.140 ± 0.006 | 0.614 ± 0.028 |
| Ethanol (4%) | 0.126 ± 0.01[a] | 0.155 ± 0.005[c] | 0.533 ± 0.033 |
| Ethanol (12%) | 0.151 ± 0.004[b] | 0.159 ± 0.002[c] | 0.593 ± 0.018 |
| Diabetic | 0.111 ± 0.004 | 0.128 ± 0.002 | 0.713 ± 0.036[b] |
| Diabetic + Ethanol (4%) | 0.105 ± 0.005 | 0.125 ± 0.004[d] | 0.618 ± 0.032 |
| ANOVA | $p \leq 0.002$ | $p \leq 0.001$ | $p \leq 0.045$ |

[a] = $p \leq 0.05$ v DE4
[b] = $p \leq 0.05$ v all other groups in the appropriate experiment.
[c] = $p \leq 0.05$ v C, D, DE4
[d] = $p \leq 0.05$ v C

Echocardiographic Texture Analysis

Of the twenty-five rats in the 10-week experiment, one rat (D group) could not be included in the texture analysis because of an inability to obtain a 16×16 pixel ROI within the anterior IVS that would exclude specular reflections. Therefore, only four animals were used for texture analysis in this diabetic group.

Quantization of ROI texture by standard statistical methods (mean intensity, variance, standard deviation of the mean, skewness or kurtosis) did not identify any intergroup differences at either 5- or 10-weeks. In addition, calculation of the relative smoothness of the ROI was also unable to discriminate between groups at either time period. However, image decomposition using the two-dimensional Haar wavelet method for calculation of detail coefficient energy did identify diabetic animals as having increased textural energy at 10-weeks. The horizontal detail coefficient (H1) approached significance in ability to differentiate experimental groups ($p \geq 0.07$), while vertical (V1), diagonal (D1), H1+V1 and H1+V1+D1 detail coefficients were all able to statistically discriminate groups (Table II).

Normalization of the detail coefficients to total energy of the original digital image resulted in the identification of increased textural energy in the diabetic animals at 5-weeks. This finding is consistent with the 10-week non-normalized data. In addition, and again consistent with the 10-week data, ethanol treated diabetic rats tended to show reduced textural energy values compared with untreated diabetic rats (Table III).

TABLE II

Image Texture Energy Calculation

| Exper. 1 (5 Wks) | $E_O$ | Approx. Coefficients (A1) | $E_{H1}$ | $E_{V1}$ | $E_{D1}$ | $E_{SUM1}$ | $E_{SUM2}$ |
|---|---|---|---|---|---|---|---|
| Control | 3288 ± 620 | 12830 ± 2438 | 170 ± 30 | 124 ± 19 | 31 ± 3 | 293 ± 46 | 324 ± 48 |
| Ethanol (12%) | 4846 ± 66[a] | 18870 ± 2582 | 278 ± 46 | 189 ± 34 | 50 ± 6 | 467 ± 77 | 517 ± 83 |
| Diabetic | 2401 ± 631 | 9206 ± 2499 | 212 ± 24 | 129 ± 21 | 56 ± 20 | 341 ± 38 | 397 ± 53 |
| Diabetic + 4% Ethanol | 2821 ± 348 | 10860 ± 1380 | 182 ± 15 | 180 ± 22 | 56 ± 11 | 362 ± 18 | 419 ± 22 |
| ANOVA | $p \leq 0.053$ | $p \leq 0.099$ | $p \leq 0.111$ | $p \leq 0.187$ | $p \leq 0.432$ | $p \leq 0.142$ | $p \leq 0.164$ |
| Exper. 2 (10 Wks) | | | | | | | |
| Control | 3477 ± 758 | 13640 ± 3010 | 136 ± 20 | 106 ± 8 | 30 ± 4 | 242 ± 22 | 272 ± 23 |
| Ethanol (4%) | 2919 ± 284 | 11400 ± 1126 | 165 ± 9 | 96 ± 10 | 33 ± 3 | 261 ± 19 | 294 ± 21 |
| Ethanol (12%) | 3116 ± 704 | 12220 ± 2788 | 127 ± 13 | 94 ± 14 | 30 ± 5 | 221 ± 27 | 250 ± 30 |
| Diabetic | 3687 ± 562 | 13760 ± 1833 | 173 ± 11 | 193 ± 9[b] | 64 ± 6[c] | 367 ± 61[b] | 430 ± 83[c] |
| Diabetic + Ethanol (4%) | 2740 ± 390 | 10370 ± 1972 | 161 ± 14 | 160 ± 12[b] | 45 ± 6 | 309 ± 19[d] | 350 ± 24[d] |
| ANOVA | $p \leq 0.816$ | $p \leq 0.817$ | $p \leq 0.071$ | $p \leq 0.001$ | $p \leq 0.001$ | $p \leq 0.003$ | $p \leq 0.001$ |

[a] = $p \leq 0.05$ v D and DE4 (Experiment 1).
[b] = $p \leq 0.05$ v C, E4, E12 (Experiment 2).
[c] = $p \leq 0.05$ v all other groups (Experiment 2)
[d] = $p \leq 0.05$ v C and E12 (Experiment 2).

TABLE III

Normalized Image Texture Energy

| | Normalized $E_{H1}$ | Normalized $E_{V1}$ | Normalized $E_{D1}$ | Normalized $E_{SUM1}$ | Normalized $E_{SUM2}$ |
|---|---|---|---|---|---|
| Experiment 1 (5 Wks) | | | | | |
| Control | 0.052 ± 0.006 | 0.039 ± 0.004 | 0.010 ± 0.001 | 0.091 ± 0.001 | 0.101 ± 0.0010 |
| Ethanol (12%) | 0.057 ± 0.007 | 0.040 ± 0.007 | 0.010 ± 0.001 | 0.097 ± 0.011 | 0.108 ± 0.011 |
| Diabetic | 0.101 ± 0.002[a] | 0.058 ± 0.008 | 0.027 ± 0.009 | 0.159 ± 0.023[b] | 0.186 ± 0.030[b] |
| Diabetic + 4% Ethanol | 0.067 ± 0.008 | 0.066 ± 0.011 | 0.020 ± 0.003 | 0.133 ± 0.015 | 0.153 ± 0.014 |
| ANOVA | $p \leq 0.018$ | $p \leq 0.084$ | $p \leq 0.076$ | $p \leq 0.028$ | $p \leq 0.021$ |
| Experiment 2 (10 Wks) | | | | | |
| Control | 0.044 ± 0.007 | 0.037 ± 0.008 | 0.101 ± 0.002 | 0.081 ± 0.012 | 0.091 ± 0.014 |
| Ethanol (4%) | 0.059 ± 0.005 | 0.034 ± 0.005 | 0.012 ± 0.001 | 0.093 ± 0.007 | 0.104 ± 0.008 |
| Ethanol (12%) | 0.053 ± 0.013 | 0.036 ± 0.006 | 0.012 ± 0.002 | 0.088 ± 0.019 | 0.100 ± 0.021 |
| Diabetic | 0.054 ± 0.006 | 0.056 ± 0.007[c] | 0.018 ± 0.001[d] | 0.106 ± 0.014 | 0.127 ± 0.012 |
| Diabetic + Ethanol (4%) | 0.061 ± 0.008 | 0.065 ± 0.012[d] | 0.017 ± 0.003[e] | 0.126 ± 0.014 | 0.143 ± 0.021 |
| ANOVA | $p \leq 0.635$ | $p \leq 0.025$ | $p \leq 0.048$ | $p \leq 0.217$ | $p \leq 0.177$ |

[a] = $p \leq 0.05$ v all other groups (Experiment 1)
[b] = $p \leq 0.05$ v C and E12 (Experiment 1)
[c] = $p \leq 0.05$ v E4 (Experiment 2)
[d] = $p \leq 0.05$ v C, E4, E12 (Experiment 2)
[e] = $p \leq 0.05$ v C (Experiment 2)

SUMMARY

Echocardiographic texture analysis using pre-processed digitized Prawl images and the two-dimensional Haar wavelet transform decomposition method discriminated between rodent models of cardiomyopathy. These textural changes were present prior to development of structural changes recorded by M-mode echocardiography. Subsequent development of M-mode changes at ten weeks were similar to those observed (as referred to in Giles T D, Ouyang J, Kerut E K, Given M B, Allen G E, McIlwain E F, Greenberg S S, "Changes, in protein KINASE C in early cardiomyopathy and in gracilis muscle in the BB/Wor diabetic rat," *Am J Physiol*, copyright 1998; 274:H295-H307, all of which is incorporated herein by reference), previously in diabetic rats and rats receiving ethanol. The interaction of diabetes mellitus and ethanol was AS evaluated since, in a previous and separate study, it had been demonstrated that there is a positive benefit of ethanol on cell signaling abnormalities produced by diabetes mellitus.

The textural changes recorded from the cardiomyopathic rats were detected only by calculating total energies of the detail coefficients from two-dimensional wavelet decomposition. Conventional statistical methodology was unable to discriminate between groups. Additionally, it was determined that other equations for calculating textural energy (log energy, Shannon's entropy) were unable to improve upon the ability to discriminate between groups.

Furthermore, the findings associated with the use of conventional statistical methodology are in general agreement with a previous study evaluating patients in the early post-myocardial infarction period. It should be noted that using the two-dimensional Haar wavelet decomposition method with an image extension algorithm and with a distance function to discriminate tissue, the horizontal detail (vertical edge) coefficient energy, of such two-dimensional Haar wavelet decomposition method, with an image extension was able to predict eventual recovery of viable myocardium from that of myocardial necrosis, as described by Neskovic et al. Hence, the ability to utilize other detail coefficients, however, including diagonal coefficients Dl, which previously were thought to contain mostly noise, probably was significantly aided by using a pre-processed digital signal a digitized "raw" ultrasound image signal. By using a pre-processed digitized signal a digitized "raw" ultrasound image signal immediately after the digital scan conversion 30, there is, I speculate, less random noise, which could influence analysis.

Moreover, normalized total energies were also evaluated by normalizing energy to the energy content of the original image ROI (Table III). This technique, which preserves grayscale transform invariance, identified increased textural energy in the diabetic animals at 5-weeks. Values for texture at 5-weeks tended to be lower in ethanol-treated diabetic rats compared with untreated diabetic rats. I speculate that normalization of data may enhance the ability to discriminate between experimental groups at an early stage in the disease process. Since speckle size is a function of ultrasound beam depth and transducer focusing properties, and thus is machine dependent, I kept machine settings constant for the entire study. Even under these conditions, normalization of the data appeared to enhance the ability to identify group differences at an early time.

CONCLUSION

As can be readily seen, at least the two-dimensional Haar wavelet image decomposition method, and, I speculate, other wavelet image decomposition methods (including three-dimensional and higher order dimensional) appear to identify early textural changes in diabetes mellitus before the onset of M-mode structural changes. In addition, first order statistical measures of texture were unable to identify early tissue abnormalities. Thus, it appears that the wavelet decomposition method on tissue data derived by non-invasive imaging techniques can be used to identify early tissue pathology.

It is noted that the embodiment of the method and apparatus for early detection of tissue pathology described herein in detail, for exemplary purposed, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pathological tissue texture quantifier apparatus for use with a computing device comprising:
   means for wavelet decomposing a region-of-interest (ROI) of a digitized "raw" image of anatomical tissue into vertical, horizontal and diagonal detail coefficients (V, H, D);
   means for calculating an energy content for each of said vertical detail coefficient (V), said horizontal detail coefficient (H) and said diagonal detail coefficient (D); and,
   means for summing the energy content of said vertical detail coefficient (V), said horizontal detail coefficient (H) and said diagonal detail cofficient (D).

2. The apparatus of claim 1, further comprising means for summing the energy content of said vertical detail coefficient and said horizontal detail coefficient.

3. The apparatus of claim 2, further comprises:
   means for normalizing said energy content for each of said vertical detail coefficient, said horizontal detail coefficient and said diagonal detail coefficient of said region-of-interest (ROI); and,
   means for normalizing said energy content for the sum of said energy content of said vertical detail coefficient, said horizontal detail coefficient and said diagonal detail coefficient.

4. The apparatus of claim 3, further comprising means for normalizing said energy content for the sum of said energy content of said vertical detail coefficient and said horizontal detail coefficient.

5. The apparatus of claim 4, wherein said energy content of each of said vertical, horizontal and diagonal detail coefficients in said region-of-interest (ROI) is defined by $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

6. The apparatus of claim 5, wherein said normalizing means normalizes said energy content with an energy content of a non-decomposed image (O) of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{Oi}$=the pixel intensity value of said non-decomposed image of said region-of-interest (ROI).

7. The apparatus of claim 4, wherein said energy content of each of said vertical, horizontal and diagonal detail coefficients in said region-of-interest (ROI) is defined by $$E_z = (1/N) * \sum_{i=1}^{N} |I_{zi}|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

8. The apparatus of claim 7, wherein said normalizing means normalizes said energy content with an energy content of a non-decomposed image (O) of said region-of-interest (ROI) defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

9. The apparatus of claim 1, wherein said vertical, horizontal and diagonal detail coefficients are first level detail coefficients of a two-dimensional Haar wavelet decomposition method.

10. The apparatus of claim 1, wherein said digitized "raw" image of said anatomical tissue is a digitized "raw" ultrasound image file.

11. The apparatus of claim 1, wherein said digitized "raw" image of said anatomical tissue is a digitized "raw" two-dimensional echocardiographic image of myocardium during end-diastole.

12. The apparatus of claim 11, wherein said two-dimensional echocardiographic image is substantially devoid of endocardial and epicardial borders.

13. The apparatus of claim 11, wherein said two-dimensional echocardiographic image is of a parasternal short axis image at a level of papillary muscles during said end-diastole.

14. The apparatus of claim 1, wherein said region-of-interest has a small two-dimensional pixel resolution.

15. The apparatus of claim 1, wherein said anatomical tissue is mammal tissue.

16. The apparatus of claim 1, wherein said anatomical tissue is Homo sapien tissue.

17. The apparatus of claim 1, wherein said anatomical tissue is muscle tissue.

18. The apparatus of claim 1, wherein said anatomical tissue is organ tissue.

19. The apparatus of claim 1, wherein said anatomical tissue is myocardium.

20. The apparatus of claim 1, wherein said digitized "raw" image of said anatomical tissue is derived from multi-dimensional non-invasive imaging techniques wherein said multi-dimensional non-invasive imaging techniques include any one of magnetic resonance imaging (MRI), computer axial tomography (CAT Scan), multi-dimensional ultrasound imaging, and radionuclide imaging.

21. A pathological tissue texture quantifier apparatus for use with a computing device comprising:

a wavelet decomposer to decompose a region-of-interest of an ultrasound image of anatomical tissue into vertical, horizontal and diagonal detail coefficients (V, H, D);

a wavelet energy calculator to calculate an energy content for each of said vertical detail coefficient (V), said horizontal detail coefficient (H) and said diagonal detail coefficient (D) of said region-of-interest of said ultrasound image of anatomical tissue;

a wavelet energy summer to sum the energy content of said vertical detail coefficient, said horizontal detail coefficient and said diagonal detail coefficient of said region-of-interest (ROI) of said ultrasound image of anatomical tissue; and, a wavelet normalizer to calculate a normalized energy content for each of said vertical detail coefficient, said horizontal detail coefficient and said diagonal detail coefficient of said region-of-interest (ROI) and a normalized energy content for said sum of said energy content of said vertical detail coefficient, said hzdetail coefficient and said diagonal detail coefficient.

22. The apparatus of claim 21, wherein said wavelet energy summer further sums the energy content of said vertical detail coefficient and said horizontal detail coefficient of said region-of-interest (ROI) of said ultrasound image of anatomical tissue; and, wherein said a wavelet normalizer further calculates a normalized energy content for said energy content of said vertical detail coefficient and said horizontal detail coefficient.

23. The apparatus of claim 21, wherein said energy content of each of said vertical, horizontal and diagonal detail coefficients in said region-of-interest (ROI) is defined by $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

24. The apparatus of claim 23, wherein said energy content are normalized with an energy content of a non-decomposed image (O) of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{Oi}$=the pixel intensity value of said non-decomposed image of said region-of-interest (ROI).

25. The apparatus of claim 21, wherein said vertical, horizontal and diagonal detail coefficients are first level detail coefficients of a two-dimensional Haar wavelet decomposition method.

26. The apparatus of claim 21, wherein said ultrasound image of said anatomical tissue is a digitized "raw" ultrasound image file.

27. The apparatus of claim 21, wherein said ultrasound image of said anatomical tissue is a digitized "raw" ultrasound image file of a two-dimensional echocardiographic image of myocardium during end-diastole.

28. The apparatus of claim 27, wherein said two-dimensional echocardiographic image is substantially devoid of endocardial and epicardial borders.

29. The apparatus of claim 27, wherein said two-dimensional echocardiographic image is of a parasternal short axis image at a level of papillary muscles during said end-diastole.

30. The apparatus of claim 21, wherein said region-of-interest has a two-dimensional pixel resolution of 16×16.

31. The apparatus of claim 21, wherein said anatomical tissue is mammal tissue.

32. The apparatus of claim 21, wherein said anatomical tissue is Homo sapien tissue.

33. The apparatus of claim 21, wherein said anatomical tissue is muscle tissue.

34. The apparatus of claim 21, wherein said anatomical tissue is organ tissue.

35. The apparatus of claim 21, wherein said anatomical tissue is myocardium.

36. The apparatus of claim 21, wherein said energy content of each of said vertical, horizontal and diagonal detail coefficients in said region-of-interest (ROI) is defined by $$E_z = (1/N) * \sum_{i=1}^{N} |I_{zi}|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

37. The apparatus of claim 36, wherein said energy content are normalized with an energy content of a non-decomposed image (O) of said region-of-interest (ROI) defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

38. A pathological tissue texture quantifier apparatus for use with a computing device comprising:
   a wavelet decomposer to decompose a region-of-interest of a digitized "raw" image of anatomical tissue into vertical, horizontal and diagonal detail coefficients (V, H, D);
   a wavelet energy calculator to calculate an energy content for each of said vertical detail coefficient (V), said horizontal detail coefficient (H) and said diagonal detail coefficient (D) of said region-of-interest;
   a wavelet energy summer to sum the energy content of said vertical detail coefficient, said horizontal detail coefficient and said diagonal detail coefficient of said region-of-interest (ROI); and,
   a wavelet normalizer to calculate a normalized energy content for each of said vertical detail coefficient (V), said horizontal detail coefficient (H) and said diagonal detail coefficient (D) of said region-of-interest (ROI) and a normalized energy content for said sum of said energy content of said vertical detail coefficient (V), said horizontal detail coefficient (H) and said diagonal detail coefficient (D).

39. The apparatus of claim 38, wherein said wavelet energy summer further sums the energy content of said vertical detail coefficient and said horizontal detail coefficient of said region-of-interest (ROI); and, wherein said a wavelet normalizer further calculates a normalized energy content for said energy content of said vertical detail coefficient and said horizontal detail coefficient.

40. The apparatus of claim 38, wherein said energy content of each of said vertical, horizontal and diagonal detail coefficients in said region-of-interest (ROI) is defined by $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

41. The apparatus of claim 40, wherein said energy content are normalized with an energy content of a non-decomposed image (O) of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{Oi}$=the pixel intensity value of said non-decomposed image of said region-of-interest (ROI).

42. The apparatus of claim 38, wherein said vertical, horizontal and diagonal detail coefficients are first level detail coefficients of a two-dimensional Haar wavelet decomposition method.

43. The apparatus of claim 38, wherein said digitized "raw" image of said anatomical tissue is derived from multi-dimensional non-invasive imaging techniques wherein said multi-dimensional non-invasive imaging techniques include any one of magnetic resonance imaging (MRI), computer axial tomography (CAT Scan), multi-dimensional ultrasound imaging, and radionuclide imaging.

44. The apparatus of claim 38, wherein said energy content of each of said vertical, horizontal and diagonal detail coefficients in said region-of-interest (ROI) is defined by $$E_z = (1/N) * \sum_{i=1}^{N} |I_{zi}|$$

wherein z=V, H, or D; i=is the number of the pixel from 1 to N wherein N=the number of pixels-within the ROI; and $I_{zi}$=the pixel intensity value for a respective one said vertical, horizontal and diagonal detail coefficients.

45. The apparatus of claim 44, wherein said energy content are normalized with an energy content of a non-decomposed image (O) of said region-of-interest (ROI) defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

46. A method for quantifying pathological tissue texture comprising the steps of:
   (a) wavelet decomposing a region-of-interest (ROI) of an ultrasound image of anatomical tissue into vertical, horizontal and diagonal detail coefficients (V, H, D);
   (b) calculating an energy content for each of said vertical detail coefficient (V), said horizontal detail coefficient (H) and said diagonal detail coefficient (D) of said region-of-interest of said ultrasound image of anatomical tissue;
   (c) summing the energy content of said vertical detail coefficient, said horizontal detail coefficient and said diagonal detail coefficient of said region-of-interest (ROI) of said ultrasound image of anatomical tissue;
   (d) normalizing each of the energy content for each of said vertical detail coefficient (V), said horizontal detail coefficient (H) and said diagonal detail coefficient (D) of said region-of-interest (ROI); and,
   (e) normalizing said sum of said energy content of said vertical detail coefficient (V), saidhorizontal detail coefficient (H) and said diagonal detail coefficient (D).

47. The method of claim 46, wherein said step of (c) further comprises the step of:
   (c1) summing the energy content of said vertical detail coefficient and said horizontal detail coefficient of said region-of-interest (ROI) of said ultrasound image of anatomical tissue.

48. The method of claim 46, wherein said step of (e) further comprises the step of:

(e1) normalizing the sum of the energy content of said vertical detail coefficient and said horizontal detail coefficient.

49. The method of claim 46, wherein said energy content of each of said vertical, horizontal and diagonal detail coefficients in said region-of-interest (ROI) is defined by $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

50. The method of claim 49, wherein said energy content are normalized with an energy content of a non-decomposed image (O) of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{Oi}$=the pixel intensity value of said non-decomposed image of said region-of-interest (ROI).

51. The method of claim 46, wherein said vertical, horizontal and diagonal detail coefficients are first level detail coefficients of a two-dimensional Haar wavelet decomposition method.

52. The method of claim 46, wherein said ultrasound image of said anatomical tissue is a digitized "raw" ultrasound image file.

53. The method of claim 46, wherein said ultrasound image of said anatomical tissue is a digitized "raw" ultrasound image file of a two-dimensional echocardiographic image of myocardium during end-diastole.

54. The method of claim 53, wherein said two-dimensional echocardiographic image is substantially devoid endocardial and epicardial borders.

55. The method of claim 53, wherein said two-dimensional echocardiographic image is of a parasternal short axis image at a level of papillary muscles during said end-diastole.

56. The method of claim 46, wherein said region-of-interest has a two-dimensional pixel resolution of 16×16.

57. The method of claim 46, wherein said anatomical tissue is mammal tissue.

58. The method of claim 46, wherein said anatomical tissue is Homo sapien tissue.

59. The method of claim 46, wherein said anatomical tissue is muscle tissue.

60. The method of claim 46, wherein said anatomical tissue is organ tissue.

61. The method of claim 46, wherein said anatomical tissue is myocardium.

62. The method of claim 46, wherein said energy content of each of said vertical, horizontal and diagonal detail coefficients in said region-of-interest (ROI) is defined by $$E_z = (1/N) * \sum_{i=1}^{N} |I_{zi}|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

63. The method of claim 62, wherein said energy content are normalized with an energy content of a non-decomposed image (O) of said region-of-interest (ROI) defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

64. A pathological tissue detector apparatus adapted to interface with an ultrasound imaging machine comprising;

(a) a region-of-interest (ROI) selector operable to select a region-of-interest, having a two-dimensional pixel resolution, from a digitized "raw" ultrasound image of anatomical suspect tissue;

(b) a wavelet decomposer to decompose said region-of-interest of said ultrasound image of anatomical suspect tissue into vertical, horizontal and diagonal detail coefficients (V, H, D);

(c) a wavelet energy calculator to calculate an energy content of each of said vertical, horizontal and diagonal detail coefficients (V, H, D) in said region-of-interest of said ultrasound image of anatomical suspect tissue; and, (d) a tissue pathology evaluator which compares said energy content of said each of said vertical, horizontal and diagonal detail coefficients (V, H, D) in said region-of-interest with energies of vertical, horizontal and diagonal detail coefficients of a standard reference model for a corresponding anatomical suspect tissue.

65. The apparatus of claim 64, further comprising:

(e) a wavelet energy summer to sum the energy content of said vertical detail coefficient, said horizontal detail coefficient and said diagonal detail coefficient of said region-of-interest (ROI) of said ultrasound image of anatomical suspect tissue; and, (f) a wavelet normalizer to calculate a normalized energy content for each of said vertical detail coefficient, said horizontal detail coefficient and said diagonal detail coefficient of said region-of-interest (ROI) and a normalized energy content for said sum of said energy content of said vertical detail coefficient, said horizontal detail coefficient and said diagonal detail coefficient.

66. The apparatus of claim 65, wherein said wavelet energy summer further sums the energy content of said vertical detail coefficient and said horizontal detail coefficient of said region-of-interest (ROI) of said ultrasound image of anatomical suspect tissue; and, wherein said wavelet normalizer further calculates a normalized energy content for said energy content of said vertical detail coefficient and said horizontal detail coefficient.

67. The apparatus of claim 65, wherein said energy content of each of said vertical, horizontal and diagonal detail coefficients in said region-of-interest (ROI) is defined by $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

68. The apparatus of claim 67, wherein said energy content are normalized with an energy content of a non-decomposed image (O) of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{Oi}$=the pixel intensity value of said non-decomposed image of said region-of-interest (ROI).

69. The apparatus of claim 65, wherein said energy content of each of said vertical, horizontal and diagonal detail coefficients in said region-of-interest (ROI) is defined by $$E_z = (1/N) * \sum_{i=1}^{N} |I_{zi}|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

70. The apparatus of claim 69, wherein said energy content are normalized with an energy content of a non-decomposed image (O) of said region-of-interest (ROI) defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

71. The apparatus of claim 64, wherein said vertical, horizontal and diagonal detail coefficients are first level detail coefficients of a two-dimensional Haar wavelet decomposition method.

72. The apparatus of claim 64, wherein said ultrasound image of anatomical suspect tissue is a digitized "raw" ultrasound image file.

73. The apparatus of claim 64, wherein said ultrasound image of anatomical suspect tissue is a digitized "raw" ultrasound image file of a two-dimensional echocardiographic image of myocardium during end-diastole.

74. The apparatus of claim 73, wherein said two-dimensional echocardiographic image is substantially devoid endocardial and epicardial borders.

75. The apparatus of claim 73, wherein said two-dimensional echocardiographic image is of a parasternal short axis image at a level of papillary muscles during said end-diastole.

76. The apparatus of claim 64, wherein said region-of-interest has a two-dimensional pixel resolution of 16×16.

77. The apparatus of claim 64, wherein said anatomical suspect tissue is mammal tissue.

78. The apparatus of claim 64, wherein said anatomical suspect tissue is Homo sapien tissue.

79. The apparatus of claim 64, wherein said anatomical suspect tissue is muscle tissue.

80. The apparatus of claim 64, wherein said anatomical suspect tissue is organ tissue.

81. The apparatus of claim 64, wherein said anatomical suspect tissue is myocardium.

82. The apparatus of claim 81, further comprising:
 (e) an echocardiograph machine interface to receive said digitized "raw" ultrasound image file from an echocardiograph machine.

83. The apparatus of claim 81, further comprising:
 (e) an RGB-grayscale converter which converts said digitized "raw" ultrasound image file to a grayscale format.

84. A method of detecting and diagnosing tissue abnormalities comprising the steps of:
 (a) performing an ultrasound imaging procedure on anatomical suspect tissue;
 (b) obtaining a digitized "raw" ultrasound image signal of a two-dimensional image;
 (c) selecting a region-of-interest (ROI) having a predetermined two-dimensional pixel resolution from said digitized "raw" ultrasound image signal;
 (d) decomposing the selected ROI image using a two-dimensional wavelet decomposition method;
 (e) calculating an energy content of each first level detail coefficient of a plurality of different first level detail coefficients of the selected ROI; and,
 (f) comparing each energy content of each first level detail coefficient with a standard reference model in order to differentiate normal from abnormal tissue.

85. The method of claim 84, further comprising the step of:
 (d) converting said digitized "raw" ultrasound image signal to a grayscale image.

86. The method of claim 84, wherein said plurality of different first level detail coefficients includes vertical, horizontal and diagonal detail coefficients (V1, H1, D1) and said energy content of each of said vertical V1, horizontal H1 and diagonal D1 detail coefficients in said region-of-interest is defined by $$E_z = (1/N) * \sum_{i=1}^{N} |I_{zi}^2|$$

wherein z=V1, H1, or D1; i=is the number of the pixel from 1 to N wherein N=the number of pixels within the ROI; and $I_{zi}$=the pixel intensity value of a given first level detail coefficient.

87. The method of claim 84, wherein said plurality of different first level detail coefficients includes vertical, horizontal and diagonal detail coefficients (V1, H1, D1) and said energy content of each of said vertical V1, horizontal H1 and diagonal D1 detail coefficients in said region-of-interest is defined by $$E_z = (1/N) * \sum_{i=1}^{N} |I_{zi}|$$

wherein z=V1, H1, or D1; i=is the number of the pixel from 1 to N wherein N=the number of pixels within the ROI; and $I_{zi}$=the pixel intensity value of a given first level detail coefficient.

88. A method of detecting cardiomyopathy comprising the steps of:

(a) selecting a region-of-interest (ROI), having a two-dimensional pixel resolution, from a digitized "raw" ultrasound image file of myocardium;

(b) decomposing said region-of-interest into vertical, horizontal and diagonal detail coefficients;

(c) calculating energy of each of said vertical, horizontal and diagonal detail coefficients (V, H, D) in said region-of-interest (ROI); and, (d) comparing said energy of said each of said vertical, horizontal and diagonal detail coefficients in said region-of-interest with energies of vertical, horizontal and diagonal detail coefficients of a standard reference model for said myocardium.

89. The method of claim 88, wherein said energy of each of said vertical, horizontal and diagonal detail coefficients in said region-of-interest is defined by $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value of a given first level detail coefficient.

90. The method of claim 89, further comprising:

(e) summing the energy of said vertical detail coefficient, said horizontal detail component and said diagonal detail coefficient of said region-of-interest and wherein said comparing step of (d) further comprises the step of:

(d1) comparing said sum of said energy in said region-of-interest with a sum of energies of vertical detail coefficient, horizontal detail coefficient and diagonal detail coefficient of said standard reference model.

91. The method of claim 90, further comprises the step of:

(f) normalizing said energy of each of said vertical, horizontal and diagonal detail coefficients in said region-of-interest with an energy of a non-decomposed image of said ROI and wherein said comparing step of (d) further comprises the step of:

(d2) comparing the normalized energy in said region-of-interest with normalized energies of said vertical detail coefficient, said horizontal detail coefficient and said diagonal detail coefficient of said standard reference model.

92. The method of claim 91, wherein said energy of said non-decomposed image of said region-of-interest is defined by $$E_O = (1/N) * \sum_{i=1}^{N} |I_{Oi}^2|$$

wherein O represents the non-decomposed ROI image; i=the number of the pixel from 1 to N wherein N=the number of pixels within the ROI; and $I_{Oi}$=the pixel intensity value for the non-decomposed ROI image.

93. The method of claim 91, wherein said energy of said non-decomposed image (O) of said region-of-interest (ROI) is defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

94. The method of claim 88, wherein said vertical, horizontal and diagonal detail coefficients are first level detail coefficients of a two-dimensional Haar wavelet decomposition method.

95. The method of claim 88, wherein said digitized "raw" ultrasound image file is a two-dimensional echocardiographic image during end-diastole.

96. The method of claim 88, wherein said digitized "raw" ultrasound image file is a two-dimensional echocardiographic image during end-diastole is substantially devoid endocardial and epicardial boarders.

97. The method of claim 88, wherein said digitized "raw" ultrasound image file is a two-dimensional echocardiographic image of a parasternal short axis image at a level of papillary muscles during end-diastole.

98. The method of claim 88, wherein said two dimensional pixel resolution is a 16×16 pixel resolution.

99. The method of claim 88, wherein said energy content of each of said vertical, horizontal and diagonal detail coefficients in said region-of-interest (ROI) is defined by $$E_z = (1/N) * \sum_{i=1}^{N} |I_{zi}|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

100. A method of detecting and diagnosing early cardiomyopathy includes the following:

(a) performing an echocardiograph procedure on an end-diastolic heart wherein an end-diastolic heart is a relaxed heart;

(b) obtaining a digitized "raw" ultrasound image signal of a two-dimensional echocardiographic image;

(c) selecting a region-of-interest (ROI) having a predetermined two-dimensional pixel resolution from said digitized "raw" ultrasound image signal;

(d) converting said digitized "raw" ultrasound image signal to a grayscale image;

(e) decomposing the selected ROI image using a two-dimensional wavelet decomposition method;

(f) calculating an energy content of each first level detail coefficient of a plurality of different first level detail coefficients of the selected ROI; and, (g) comparing each energy content of each first level detail coefficient with a standard reference model in order to differentiate normal from abnormal tissue.

101. The method of claim 100, wherein said plurality of different first level detail coefficients includes vertical, horizontal and diagonal detail coefficients (V1, H1, D1) and the energy content of each of said vertical V1, horizontal H1 and diagonal D1 detail coefficients in said region-of-interest is defined by $$E_z = (1/N) * \sum_{i=1}^{N} |I_{zi}^2|$$

wherein z=V1, H1, or D1; i=is the number of the pixel from 1 to N wherein N=the number of pixels within the ROI; and $I_{zi}$=the pixel intensity value of a given first level detail coefficient.

102. The method of claim 101, further comprising:

(h) summing the energy content of said vertical detail coefficient, said horizontal detail component and said diagonal detail coefficient of said region-of-interest and wherein said comparing step of (g) further comprises the step of:

(g1) comparing said sum of said energy content in said region-of-interest with a sum of energies of vertical detail coefficient, horizontal detail coefficient and diagonal detail coefficient of said standard reference model.

103. The method of claim 102, further comprises the step of:

(i) normalizing said energy content of each of said vertical, horizontal and diagonal detail coefficients in said region-of-interest with an energy content of a non-decomposed image of said ROI and wherein said comparing step of (g) further comprises the step of:

(g2) comparing the normalized energy content in said region-of-interest with normalized energies of said vertical detail coefficient, said horizontal detail coefficient and said diagonal detail coefficient of said standard reference model.

104. The method of claim 103, wherein said energy content are normalized with an energy content of a non-decomposed image (O) of said region-of-interest (ROI) defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

105. The method of claim 103, wherein said energy content are normalized with an energy content of a non-decomposed image (O) of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{Oi}$=the pixel intensity value of said non-decomposed image of said region-of-interest (ROI).

106. The apparatus of claim 105, wherein said normalizing means normalizes said energy content with an energy content of a non-decomposed image (O) of said region-of-interest (ROI) defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

107. The method of claim 100, wherein said plurality of different first level detail coefficients includes vertical, horizontal and diagonal detail coefficients (V1, H1, D1) and the energy content of each of said vertical V1, horizontal H1 and diagonal D1 detail coefficients in said region-of-interest is defined by $$E_z = (1/N) * \sum_{i=1}^{N} |I_{zi}|$$

wherein z=V1, H1, or D1; i=is the number of the pixel from 1 to N wherein N=the number of pixels within the ROI; and $I_{zi}$=the pixel intensity value of a given first level detail coefficient.

108. A pathological tissue texture quantifier apparatus for use with a computing device comprising:

means for wavelet decomposing a region-of-interest (ROI) of a digitized image of anatomical tissue into vertical, horizontal and diagonal detail coefficients (V, H, D);

means for calculating the energy content for each of said vertical detail coefficient (V), said horizontal detail coefficient (H) and said diagonal detail coefficient (D); and, means for summing the energy content of said vertical detail coefficient (V), said horizontal detail coefficient (H) and said diagonal detail coefficient (D).

109. The apparatus of claim 108, further comprising means for summing the energy content of said vertical detail coefficient and said horizontal detail coefficient.

110. The apparatus of claim 109, further comprises:

means for normalizing said energy content for each of said vertical detail coefficient, said horizontal detail coefficient and said diagonal detail coefficient of said region-of-interest (ROI); and, means for normalizing said energy content for the sum of said energy content of said vertical detail coefficient, said horizontal detail coefficient and said diagonal detail coefficient.

111. The apparatus of claim 110, further comprising means for normalizing said energy content for the sum of said energy content of said vertical detail coefficient and said horizontal detail coefficient.

112. The apparatus of claim 111, wherein said energy content of each of said vertical, horizontal and diagonal detail coefficients in said region-of-interest (ROI) is defined by $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

113. The apparatus of claim 112, wherein said normalizing means normalizes said energy content with a energy content of a non-decomposed image (O) of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{Oi}$=the pixel intensity value of said non-decomposed image of said region-of-interest (ROI).

114. The apparatus of claim 111, wherein said energy content of each of said vertical, horizontal and diagonal detail coefficients in said region-of-interest (ROI) is defined by $$E_z = (1/N) * \sum_{i=1}^{N} |I_{zi}|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

115. The apparatus of claim 108, wherein said vertical, horizontal and diagonal detail coefficients are first level detail coefficients of a two-dimensional Haar wavelet decomposition method.

116. The apparatus of claim 108, wherein said digitized image of said anatomical tissue is a digitized ultrasound image.

117. The apparatus of claim 108, wherein said digitized image of said anatomical tissue is a digitized two-dimensional echocardiographic image of myocardium during end-diastole.

118. The apparatus of claim 117, wherein said two-dimensional echocardiographic image is substantially devoid of endocardial and epicardial borders.

119. The apparatus of claim 117, wherein said two-dimensional echocardiographic image is of a parasternal short axis image at a level of papillary muscles during said end-diastole.

120. The apparatus of claim 108, wherein said region-of-interest has a small two-dimensional pixel resolution.

121. The apparatus of claim 108, wherein said anatomical tissue is mammal tissue.

122. The apparatus of claim 108, wherein said anatomical tissue is Homo sapien tissue.

123. The apparatus of claim 108, wherein said anatomical tissue is muscle tissue.

124. The apparatus of claim 108, wherein said anatomical tissue is organ tissue.

125. The apparatus of claim 108, wherein said anatomical tissue is myocardium.

126. The apparatus of claim 108, wherein said digitized image of said anatomical tissue is derived from multi-dimensional non-invasive imaging techniques wherein said multi-dimensional non-invasive imaging techniques include any one of magnetic resonance imaging (MRI), computer axial tomography (CAT Scan), multi-dimensional ultrasound imaging and radionuclide imaging.

127. The apparatus of claim 108, wherein said digitized image of said anatomical tissue is a two-dimensional digitized "raw" image of said anatomical tissue.

128. The apparatus of claim 108, wherein said digitized image of said anatomical tissue is a digitized "raw" image of said anatomical tissue.

129. The apparatus of claim 108, wherein said digitized image of said anatomical tissue is a digitized image of said anatomical tissue having been subjected to digital image processing.

130. The apparatus of claim 108, wherein said digitized image of said anatomical tissue is a digitized image of said anatomical tissue having been subjected to a smoothing function.

131. The apparatus of claim 108, wherein said digitized image of said anatomical tissue is a video signal of said anatomic tissue.

132. A pathological tissue texture quantifier apparatus for use with a computing device comprising:
    means for wavelet decomposing a region-of-interest (ROI) of a digitized image of anatomical tissue into vertical, horizontal and diagonal detail coefficients(V, H, D);
    means for calculating the energy content for each of said vertical detail coefficient (V), said horizontal detail coefficient (H) and said diagonal detail coefficient (D); and,
    means for summing the energy content of said vertical detail coefficient (V) and said horizontal detail coefficient (H).

133. The apparatus of claim 132, further comprising means for summing the energy content of said vertical detail coefficient, said horizontal detail coefficient and said detail coefficient.

134. The apparatus of claim 133, further comprises:
    means for normalizing said energy content for each of said vertical detail coefficient, said horizontal detail coefficient and said diagonal detail coefficient of said region-of-interest (ROI); and,
    means for normalizing said energy content for the sum of said energy content of said vertical detail coefficient, said horizontal detail coefficient and said diagonal detail coefficient.

135. The apparatus of claim 134, further comprising means for normalizing said energy content for the sum of said energy content of said vertical detail coefficient and said horizontal detail coefficient.

136. The apparatus of claim 135, wherein said energy content of each of said vertical, horizontal and diagonal detail coefficients in said region-of-interest (ROI) is defined by $$E_z = (1/N) * \sum_{i=1}^{N} |I_{zi}^2|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

137. The apparatus of claim 136, wherein said normalizing means normalizes said energy content with an energy content of a non-decomposed image (O) of said region-of-interest (ROI) defined by $$E_O = (1/N) * \sum_{i=1}^{N} |I_{Oi}^2|$$

wherein i=is the number of the pixel from 1 to N wherein N=the number of pixels within the ROI; and $I_{Oi}$=the pixel intensity value of said non-decomposed image of said region-of-interest (ROI).

138. The apparatus of claim 135, wherein said energy content of each of said vertical, horizontal and diagonal detail coefficients in said region-of-interest (ROI) is defined by $$E_z = (1/N) * \sum_{i=1}^{N} |I_{zi}|$$

wherein z=V, H, or D; i=is the number of the pixel from 1 to N wherein N=the number of pixels within the ROI; and $I_{zi}$=the pixel intensity value for a respective one said vertical, horizontal and diagonal detail coefficients.

139. The apparatus of claim 138, wherein said normalizing means normalizes said energy content with an energy content of a non-decomposed image (O) of said region-of-interest (ROI) defined by $$E_O = (1/N) * \sum_{i=1}^{N} |I_{Oi}|$$

wherein i=is the number of the pixel from 1 to N wherein N=the number of pixels within the ROI; and $I_{Oi}$=the pixel intensity value of said non-decomposed image of said region-of-interest (ROI).

140. The apparatus of claim 132, wherein said vertical, horizontal and diagonal detail coefficients are first level detail coefficients of a two-dimensional Haar wavelet decomposition method.

141. The apparatus of claim 132, wherein said digitized image of said anatomical tissue is derived from multi-dimensional non-invasive imaging techniques wherein said multi-dimensional non-invasive imaging techniques include any one of magnetic resonance imaging (MRI), computer axial tomography (CAT Scan), multi-dimensional ultrasound imaging and radionuclide imaging.

142. The apparatus of claim 132, wherein said digitized image of said anatomical tissue is a two-dimensional digitized "raw" image of said anatomical tissue.

143. The apparatus of claim 132, wherein said digitized image of said anatomical tissue is a digitized "raw" image of said anatomical tissue.

144. The apparatus of claim 132, wherein said digitized image of said anatomical tissue is a digitized image of said anatomical tissue having been subjected to digital image processing.

145. The apparatus of claim 132, wherein said digitized image of said anatomical tissue is a digitized image of said anatomical tissue having been subjected to a smoothing function.

* * * * *